(12) United States Patent
Langseth et al.

(10) Patent No.: US 10,783,271 B1
(45) Date of Patent: Sep. 22, 2020

(54) SECURE VIEW-BASED DATA JOINS IN A MULTIPLE TENANT DATABASE SYSTEM

(71) Applicant: Snowflake Inc., San Mateo, CA (US)

(72) Inventors: Justin Langseth, Kailua, HI (US); Matthew J. Glickman, Larchmont, NY (US); Christian Kleinerman, Burlingame, CA (US); Robert Muglia, Mercer Island, WA (US); Daniel Freundel, San Francisco, CA (US); Thierry Cruanes, San Mateo, CA (US); Allison Waingold Lee, San Carlos, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/902,266

(22) Filed: Jun. 16, 2020

Related U.S. Application Data

(63) Continuation of application No. 16/708,067, filed on Dec. 9, 2019, now Pat. No. 10,713,380, which is a continuation of application No. 16/368,339, filed on Mar. 28, 2019.

(51) Int. Cl.
*G06F 21/00* (2013.01)
*G06F 21/62* (2013.01)
*G06F 16/2455* (2019.01)
*H04L 9/32* (2006.01)

(52) U.S. Cl.
CPC ...... *G06F 21/6227* (2013.01); *G06F 16/2456* (2019.01); *H04L 9/3242* (2013.01)

(58) Field of Classification Search
CPC ............ G06F 21/6227; G06F 21/6218; G06F 21/6245; G06F 16/2456; H04L 9/3242
See application file for complete search history.

(56) References Cited

U.S. PATENT DOCUMENTS

| 8,131,738 B2 | 3/2012 | Furukawa | |
| 2015/0033032 A1* | 1/2015 | Furukawa | H04L 9/0894 713/189 |
| 2018/0357427 A1* | 12/2018 | Lindell | G06F 16/2455 |

OTHER PUBLICATIONS

Barbara Carminati, Elena Ferrari, Jianneng Cao, and Kian Lee Tan. 2010. "A framework to enforce access control over data streams". ACM Trans. Inf. Syst. Secur. 13, 3, Article 28 (Jul. 2010), 31 pages. DOI:https://doi.org/10.1145/1805974.1805984 (Year: 2010).*

* cited by examiner

*Primary Examiner* — Yogesh Paliwal
(74) *Attorney, Agent, or Firm* — Womble Bond Dickinson (US) LLP

(57) ABSTRACT

Systems, methods, and devices for generating a secure join of database data are disclosed. A method includes determining data stored in a first account to be compared with data stored in a second account. The method includes determining a function for generating a secure join key, wherein the secure join key includes a hashed string that hashes one or more of a data entry of the first account and a data entry of the second account. The method includes providing the secure join key to the first account and/or the second account.

27 Claims, 12 Drawing Sheets

SECURE VIEW-BASED DATA JOINS IN A MULTIPLE TENANT DATABASE SYSTEM

CROSS-REFERENCE TO RELATED APPLICATION

This application is a continuation of U.S. application Ser. No. 16/368,339, filed Mar. 28, 2019, the entire contents of which are hereby incorporated by reference.

TECHNICAL FIELD

The present disclosure relates to databases and more particularly relates to secure joins of database data.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

In certain implementations of database technology, different organizations or companies may wish to securely link or join their database data. Further to the above example, the retail store may wish to link or share some of its data with outside organizations, such as a product vendor, a healthcare provider for its employees, a shipping company, and so forth. However, the retail store would want to ensure that its data was secure and that the outside organizations could not view all of its data with unrestricted access. The retail store may also wish to enable outside organizations to link, join, and/or analyze its data without permitting the outside organizations to view or export raw data. Depending on the content of the data, it can be imperative to ensure that the data is secure due to privacy concerns, contractual agreements, government agency restrictions, and so forth. For example, personally identifiable information (PII), protected health information (PHI), and other forms of fine-grained data may need to remain secure even when such database data is shared with outside organizations.

In database systems, secure views may be used as a security mechanism to restrict access to specific information stored in the database. A secure view may be specifically designated for data privacy to limit access to sensitive data, such as PII or PHI, that should not be exposed to outside organizations and/or all users of the database. The implementation of views, and how the implementation of views is handled, can potentially lead to information leakage. For example, during query optimization, certain filters may be pushed across the view definition closer to input tables and information may be leaked to a user if a user-specified filter is evaluated before secure predicates are evaluated. Secure views can ensure that the security of a regular view cannot be circumvented by clever querying of data that is stored in the regular view.

In some instances, two or more organizations may wish to join data to make certain determinations about data that is common between the two or more organizations, or for one organization to enrich the data of the other. For example, two companies may wish to determine how many customers the two companies have in common. This may be a common inquiry between, for example, buyers and sellers of advertising, between healthcare payers and providers, and so forth. This can be a challenging question to answer without one party exposing its entire customer list to the other party. The customer list may include sensitive information that should not be shared with the other party and/or it may include information that the sharing party does not wish to expose for contractual or business reasons. The two parties may wish to securely join data so the parties may determine common data between the two parties or make other beneficial determinations, or to enrich each other's data, without exposing all underlying data. Disclosed herein are methods, systems, and devices for securely joining database data.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
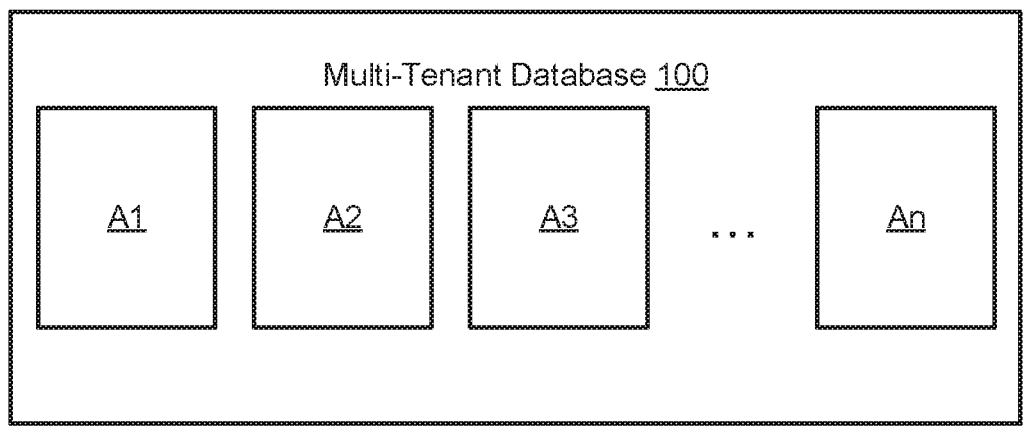
FIG. 1 is a schematic block diagram illustrating accounts in a multi-tenant database, according to one embodiment.

In certain instances, two or more organizations or companies may wish to share data, join data, or enrich data. In an example of joining data, two companies may wish to determine how many customers the two companies have in common. This can be a difficult inquiry to answer without one or both parties exposing its entire customer list to the other party. The customer list might include sensitive information such as personally identifiable information or protected health information, or the customer list itself might constitute valuable intellectual property that should not be shared with other parties. In such an instance, it may be valuable to securely compare data stored in separate data stores that are associated with the two companies, without allowing either company to view certain information about the data itself or how the data is stored.

Disclosed herein are systems, methods, and devices for joining database data between two parties in a secure manner that does not expose sensitive information included in the data itself or sensitive information about structural or organization details about how the data is stored. Such methods and systems for joining database may herein be referred to as a secure join. In an embodiment, a method includes determining data stored in a first account to be compared with data stored in a second account, wherein the data stored in the first account and the data stored in the second account are directed to a same subject matter. In an exemplary embodiment, the first account is associated with a first company and the second account is associated with a second company. The first company and the second company wish to compare customer lists to determine which customers, and/or how many customers, the two companies have in common. The method includes defining a user-defined function including procedural logic for determining an overlap count between the data stored in the first account and the data stored in the second. The user-defined function further includes as an input a secure join key. The secure join key is a hash that may include a salted value from each account, wherein the one or more salted values are salted before being hashed. The user-defined function may be defined by either of the first account or the second account and may be shared with the other account such that it may be run by a compute node associated with either of the first account or the second account. The user-defined function, along with the secure join key, is configured to compare data stored by the first account against data stored by the second account to determine which datapoints, and/or how many datapoints, the two accounts have in common.

In an example, a first account (referred to in this example as the Provider) will share a secure user-defined function (UDF) that permits a second account (referred to in this example as the Consumer) to check if a specific datapoint exists in the Provider's database. For purposes of this example, the specific datapoint will refer to a customer identification number that should not otherwise be shared between the accounts. The secure UDF will return a one if there is a match between the Consumer's list of customer identification numbers and the Provider's list of customer identification numbers. The secure UDF will return a zero if there is not a match. The secure UDF may be used as part of a SQL statement to compare all datapoints between the Provider's customer identification numbers and the Consumer's customer identification numbers to determine all matches. The Consumer connects to the Provider's shared secure UDF The secure UDF is used to count common customers using the Provider's secure direct lookup function. Because the secure UDF can securely access the Provider's data without exposing it to the Consumer, and because the Provider cannot see which datapoints the Consumer looks up, the process is secure. However, there is a risk that the Consumer can know with certainty if any particular customer for which the Consumer is aware of is a customer of the Provider. This property may not be desirable in some implementations as it allows the Consumer to probe the Provider's customer base for any particular known customer.

Further to the above example, a different implementation is provided that may be referred to herein as a secure join. The Provider defines a secure user-defined function (UDF) to generate a secure join key. In an embodiment, the secure join key is a hash that includes salted data from the Provider and salted data from the Consumer. The Provider's data may be salted and the Consumer's data may be salted before either data is hashed to generate the secure join key. In an embodiment, the secure join key may further include a customer account number associated with the Provider and/or the Consumer. The customer account number may be associated with a cloud-based database system that generates the secure join key. The secure UDF is shared with the Consumer along with another Structure Query Language (SQL) secure UDF to perform a count of overlapping customer datapoints between the Provider and the Consumer. The secure UDF uses a one-way hash to convert the Consumer's customer datapoints into a meaningless string. The secure UDF may run inside the Consumer's compute nodes. The secure UDF may run on compute nodes of either company such that the other company does not attain visibility into when or whether the secure UDF was run. In an example, the Provider includes an account identification associated with the Consumer as part of the one-way hash. This ensures that hashes cannot be used to measure data overlap with any other account or provider. The Consumer may use this hash approach for row-by-row or bulk matching to compare the customer datapoints stored in the Provider's data store versus the customer datapoints stored in the Consumer's data store.

Further to the above example, a different implementation is provided that may be referred to herein as a reverse share secure join. In this implementation, the Consumer may create a secure view of its own customer datapoints and run the secure view through a hash function such that the customer datapoints are encoded and "salted." When a datapoint is salted, additional information (i.e. the salt) is added to the datapoint. The salt is only known by the owner of that datapoint. In an example, the datapoint is customer's first name, for example the datapoint is "John." The salted datapoint will have a salt adhered to it that is only known by the owner of the datapoint. In the example, the salted datapoint may read "JohnSALT123." It should be appreciated that the salt may include any string of characters that is known only to the owner of the datapoint. The Consumer may share only the salted hash values with the Provider in a reverse share. In this example, the Consumer may include additional salted hash values that do not represent any real customer datapoints. This may prevent the Provider from deducing any information about the true size of the Consumer's customer base by inspecting the contents of the reverse share. This technique may be referred to as "noise injection" and does not harm the analysis of the common customer datapoints existing between the Provider and the Consumer. After the Consumer shares the salted hashed customer datapoints with the Provider, the Consumer may call a secure SQL UDF to perform a secure join. The Consumer provides the hash value and the salt value to the secure SQL UDF such that the secure SQL UDF may process the salted hashed customer datapoints. The secure SQL UDF may then hash and salt the Provider's customer datapoints to generate the secure join key and return the distinct count of joint customer datapoints between the Provider and the Consumer.

Disclosed herein are systems, methods, and devices for creating a secure join of database data. A first party and a second party may wish to determine common data between the two parties. The first party and the second party may wish to determine all common datapoints of a certain subject matter, or of a certain column identifier, between a data store associated with the first account and a data store associated with the second account. The first party may generate a secure UDF and share it with the second party. The secure UDF may include, in an example embodiment, a SQL script that is configured to count overlapping data between the two parties. The first party may define the secure UDF to use a one-way hash to convert the second party's sensitive data into a meaningless string to generate a secure join key. This secure UDF may run inside the second party's compute nodes such that the first party does not know that the secure UDF was run or what data was passed through the secure UDF. The first party may further include an account identification as part of the one-way hash that is associated with the second party account. When the second party's account identification is included as part of the one-way hash, the secure UDF cannot be used to measure data overlap with anyone other than the two parties, and in some implementations may not be used to measure data overlap with any account outside the same database of the first account. The first party may generate and share the secure UDF according to the following example SQL script:

```
create or replace secure function
   get_secure_join_key(customer_key_string string)
returns string as
$$
sha2(customer_key_string || sha2(current_account( ) ||
   'provider secret salt'))
$$;
create or replace secure function secure_lookup(secure_
   join_key string, consumer_salt string)
returns numeric(10)
as
$$
select count(*) as count_custs
from provider_customers c
where secure_join_key=
sha2(nvl(C_EMAIL_ADDRESS,to_char(random( ))) ||
   consumer_salt || sha2(current_account( ) || 'provider
   secret salt'))
$$;
grant usage on function get_secure_join_key(string) to
   share SJ_DEMO_SHARE;
grant usage on function secure_lookup(string, string) to
   share SJ_DEMO_SHARE;
```

Further to this example, the second party may use the hash approach to determine matching between the two parties one row at a time, or to perform bulk matching. Either method may give the same security benefit because the first party does not have visibility into how or when the first party's secure UDF is called by the second party. Additionally, the first party cannot see what data was run through the secure UDF by the second party. This provides enhanced security benefits over the use of a secure UDF when attempting to discern matching data between two accounts. The following example SQL script illustrates how the second party may set up a share from the first party and perform a count of common datapoints between the second party and the first party.

```
CONSUMER ACCOUNT
   create customer key string function
   create or replace function
   get_customer_key_string(c_email_address string, con-
      sumer_salt string)
   returns string as
   $$
   nvl(C_EMAIL_ADDRESS,to_char(random( )))|| con-
      sumer_salt
   $$;
      make table of secure join keys (this is needed in some
         cases UDF's can not call other UDFs within them).
   create or replace temporary table joinkeys as
   select
   sj_test.public.get_secure_join_key(get_customer_key_
      string(C_EMAI    L_ADDRESS, 'consumersalt'))
      secure_join_key
   from consumer_customers c;
      run secure join overlap count
   select
   sum(sj_test.public.secure_lookup(secure_join_key, 'con-
      sumersalt')) overlapping_customers,
``` count(*) total_customers, ((overlapping_customers/total_customers)*100) overlap_pct
from joinkeys;

| Row | OVER- LAPPING_CUSTOMERS | TOTAL_CUSTOMERS | OVER- LAP_PCT |
|---|---|---|---|
| 1 | 570761 | 2926535 | 19.503000 |

In an embodiment, the second party may provide a "reverse share" to provide additional security. In this embodiment, the second party may create a secure view of its data and run the data in the secure view through a hash function. The salted hash values that have been run through the hash function may be shared with the first party in the reverse share. The second party may call an SQL UDF to perform a secure join and provide a salt value for the hashed data points. This SQL UDF may return a distinct count of joint data points between the second party and the first party. In an embodiment, the SQL UDF runs on the second party's compute resources such that the first party does not have any visibility into whether the query was run or into the results of the query. Likewise, the second party is only able to see how many overlapping data points exist between the second party and the first party. The second party is unable to see any information about the content or the size of the first party's non-overlapping data points.

Further in a reverse share embodiment, the second party has the option to include additional hash values that do not represent any actual data points in the database. The additional hash values may prevent the first party from deducing anything about the size of the second party's actual data by inspecting the contents of the reverse share. This technique may be referred to as a "noise injection" and does not harm analysis of the shared data.

One potential risk the first party faces is the second party intentionally probing the first party with successive requests and only altering one row with each request. The second party may do this to determine whether a specific data point is present in the first party's dataset. In an implementation where this is a concern, the first party may include additional logic in the counting UDF to protect against this raw-row probing by the second party. The first party may instruct the counting UDF to perform a distinct row reduction on the reverse share input set. The first party may instruct the counting UDF to enforce a minimum number of distinct rows on the reverse share inputs. The first party may instruct the counting UDF to add a random numeric value that randomly varies the returned result by, for example, plus or minus ten.

The first party may instruct the counting UDF to round off the actual distinct overlapping result to a certain integer, for example to the nearest ten by using SQL mathematical functions. The first party may instruct the counting UDF to enforce a minimum number of overlap "hits" for the UDF to return a non-zero result through the use of a SQL HAVING clause. One or more of these instructions may provide Provider-side noise to the result such that raw row probing by the second party is more difficult.

A user-defined function (UDF) is a function that may be provided by a user of a program, database, or other environment. As discussed herein, a secure UDF refers to a UDF having a secure definition. In a relational database management system, a UDF may provide a mechanism for extending functionality of the database server by adding a function that may be evaluated in, for example, structured query language (SQL) statements. The SQL standard may distinguish between scalar UDFs and table UDFs. A scalar UDF may return only a single value whereas a table UDF may return a relational table comprising zero or more rows where each row may have one or more columns. Once created, a UDF may be used in expressions in SQL statements.

Each user-defined function includes properties and characteristics. A scalar function returns a single data value (i.e. not a table) with a return clause. In an embodiment, scalar functions may utilize all scalar data types with the exception of user-defined data types. A table-valued function may return the result of a single select statement and a multi-statement table-valued function may return a table.

In embodiments disclosed herein, where a user-defined function is used for securely analyzing data, the user-defined function may have a secure user-defined function definition. The secure UDF may be created by a first account and shared with one or more secondary accounts. The first account may grant usage privileges to the one or more secondary accounts such that the secondary accounts may, for example, utilize the functionality of the UDF without viewing any procedural logic making up the UDF.

With respect to secure views, some optimizations for views require access to underlying data in the base tables for the view. Access to the underlying data may permit data that is hidden from users of the view to be exposed by, for example, UDFs or other programmatic methods. Secure views as disclosed in the present application do not utilize such optimizations and ensure that users have no access to the underlying data. According to one embodiment, the query expression to create a standard view (may also be referred to as the view definition or text) may be visible to users. In such an embodiment, a user may not wish to expose the underlying tables or internal structural details for a view due to security or privacy reasons. With a secure view as disclosed herein, the view definition and details are only visible to authorized users i.e. users that have been granted the role that owns the view.

A view may be defined as a secure view when it is specifically designated for data privacy or to limit access to data that should not be exposed to all accounts of the underlying table. Data might be exposed in a non-secure view when, for example, an account has access to only a subset of data. An example scenario where information may be leaked includes the following. A database table includes employee data for an entire company and a view is defined to expose employee data for a single department. An account, for example belonging to a head of the single department, is granted access to the view but not the underlying table. In such an embodiment, a user may gain insight into data from other departments by querying on the view. If the filter in the query is evaluated before the join between the "employee" field and the "department" field, the user may deduce whether anyone in the entire company satisfies a certain metric (e.g. has a salary over x amount, etc.). Such a technique may be utilized to query any data within the base table. A user-defined function that carries a state across invocations can be utilized in a similar way to leak the results of even more sophisticated queries on the base table data.

Secure views permit database client accounts to expose a restricted data set to other users without the possibility of the underlying, unrestricted data being exposed to those other users. Similar to views, user-defined functions (UDFs) permit a client account to expose restricted data to other users, with additional capabilities due to argument processing and procedural language support. Secure UDFs may provide the same security guarantees as secure views.

In an embodiment, a secure view provides several security guarantees when compared against a regular view. In an embodiment, the secure view does not expose the view definition to non-owners of the view. This impacts various operations that access the data dictionary. In an embodiment, the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In an embodiment, the secure view does not expose data from tables accessed by the view which is filtered out by the view. In such an embodiment, a client account associated with a non-secure view may access data that would be filtered out by taking advantage of query optimizations that may cause user expressions to be evaluated before security expressions (e.g. filters and joints). In such an embodiment, to achieve this requirement, the set of query optimizations that can be applied to a query containing a secure view may be restricted to guarantee that the user expressions that can leak data are not evaluated before the view is filtered.

Multi-tenant databases or multi-tenant data warehouse support multiple distinct customer accounts at once. As an example, FIG. 1 is a schematic block diagram illustrating a multi-tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multi-tenant data warehouses or database system.

In some cases, it may be desirable to allow cross-account data sharing. However, no current multi-tenant database system allows sharing of data between different customer accounts in an instantaneous, zero-copy, easy-controllable fashion.

Based on the foregoing, disclosed herein are systems, methods, and devices that, in one embodiment, may be implemented for generating a secure join in a multi-tenant online database system. Some embodiments allow the implementation of secure joins, secure UDFs, and/or secure views between different customer accounts and may make the data instantly accessible with no need to copy data. Some embodiments provide access to data using fine-grained controls to maintain separation of desired data while allowing access to data that a customer wishes to share.

Embodiments disclosed herein provide systems, methods, and devices for sharing a "share object" or "database object" between a sharer account and one or more other accounts in a database system. The share object or database object in one implementation may include procedural logic that is defined by a user of a client account (in one implementation, by a user of the sharer account). The share object may be supported in scalar and table-valued user-defined functions (UDFs) and may be defined by any suitable language. In an implementation, the procedural logic of the share object may be used by one or more other accounts without permitting the one or more other accounts to view the underlying code defining the procedural logic. The share object or database object may further include database data such as data stored in a table of the database. The share object or database object may include metadata about database data such as minimum/maximum values for a table or micro-partition of a database, underlying structural or architectural details of the database data, and so forth. The share object may include a listing of all other accounts that may receive cross-account access rights to elements of the share object. The listing may indicate, for example, that a second account may use procedural logic of the share object without seeing any underlying code defining the procedural logic. The listing may further indicate, for example, that a third account may use database data of one or more tables without seeing any structural information or metadata about the database data. The listing may indicate any combination of usage privileges for elements of the share object, including whether secondary accounts may see metadata or structural information for database data or procedural logic.

The embodiments disclosed herein may be supported in scalar and table-valued user-defined functions (UDFs). Various languages may be utilized including SQL and Javascript for each of the scalar and table-valued UDFs.

In an embodiment, a scalar SQL UDF includes a SQL expression that including parameters that may be replaced with arguments appearing in the function invocation. The expression may include a query expression (i.e. a subquery), and in an embodiment, the query expression must be guaranteed to return a single row and a single column. At compile-time, a function invocation is replaced with the SQL expression and parameters in the expression are replaced with the invocation's arguments. The result may be a simple SQL expression or a subquery (may be correlated or non-correlated). In an embodiment, because a scalar SQL UDF may include arbitrary SQL expressions, the secure UDF may be configured to (1) not expose the view definition to non-owners of the view and (2) not expose information about any underlying data of the view.

In an embodiment, a table-valued SQL UDF is similar to a view wherein the query may include parameters. As a result, table-valued UDFs may appear as correlated tables and may be decorrelated during query compilation. In an embodiment, because a table-valued SQL UDF can include arbitrary SQL expressions, the secure UDFs may be configured to (1) not expose the view definition to non-owners of the view, (2) not expose information about any underlying data of the view, and (3) not expose data from tables accessed by the view which is filtered out by the view.

In an embodiment, a scalar Javascript UDF is converted to a built-in function that evaluates a piece of Javascript code for reach row that is processed and passes arguments from those rows into the function. In an embodiment, because a Javascript UDF cannot access database tables, the UDF may be configured to (1) not expose information about any underlying data of the view and (2) not expose data from tables accessed by the view which is filtered out by the view.

In an embodiment, a table-valued Javascript UDF is processed such that rows are grouped together and the Javascript code is evaluated per group and row processed by passing expressions from rows into the function. In an embodiment, because a Javascript UDF cannot access database tables, the UDF may be configured to (1) not expose information about any underlying data of the view and (2) not expose data from tables accessed by the view that are filtered out by the view.

Embodiments disclosed herein provide technology which may be used for determining common datapoints between different customer accounts in an online database and/or online data warehouse. In one embodiment, a secure join to determine common datapoints is enabled using cross-account role grants that allow users in one customer account to access data in another customer account in a controlled and instantaneous fashion by way of a secure view and/or a secure UDF, without the need to copy data. For example, the shared data may remain within the sharing account while allowing a foreign account to run a secure UDF on the shared data.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Referring now to the figures, FIG. 1 is a schematic block diagram illustrating a multi-tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multi-tenant data warehouses or database system.

Figure 2:
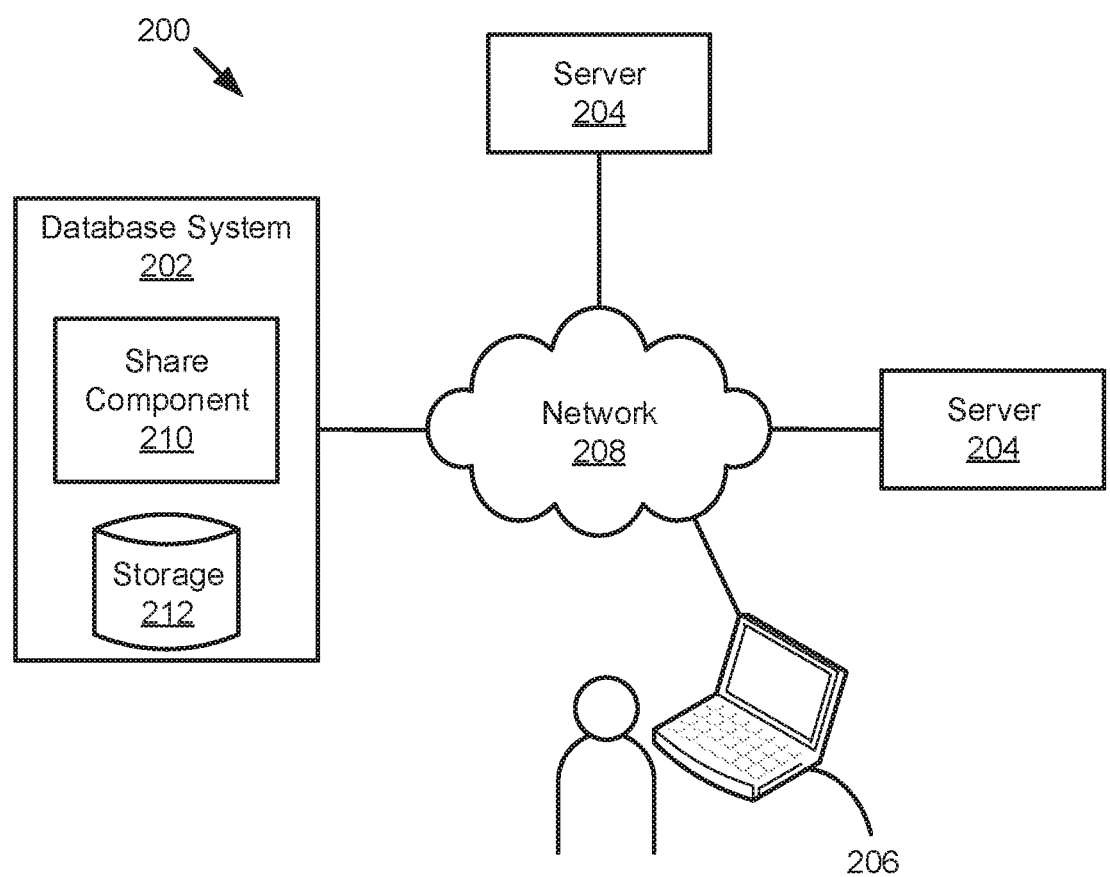
FIG. 2 is a schematic diagram illustrating a system for providing and accessing database services, according to one embodiment.

FIG. 2 is a schematic diagram of a system 200 for providing and accessing database data or services. The system 200 includes a database system 202, one or more servers 204, and a client computing system 206. The database system 202, the one or more servers 204, and/or the client computing system 206 may communicate with each other over a network 208, such as the Internet. For example, the one or more servers 204, and/or the client computing system 206 may access the database system 202 over the network 208 to query a database and/or receive data from a database. The data from the database may be used by the one or more servers 204 or client computing system 206 for any type of computing application. In one embodiment, the database system 202 is a multi-tenant database system hosting data for a plurality of different accounts.

The database system 202 includes a share component 210 and storage 212. The storage 212 may include storage media for storing data. For example, the storage 212 may include one or more storage devices for storing database tables, schemas, encryption keys, data files, or any other data. The share component 210 may include hardware and/or software for enabling the cross-account sharing of data or services and/or for associating view privileges with data or services. For example, the share component 210 may define a secure UDF and/or a secure view such that two or more accounts may determine common datapoints by way of the secure UDF without revealing the datapoints themselves or any other datapoints that are not common between the accounts.

Further for example, the share component 210 may process queries/instructions received from remote devices to access shared data or share data. The queries/instructions may be received from the one or more servers 204 or client computing system 206. In one embodiment, the share component 210 is configured to allow sharing data between accounts without creating duplicate copies of tables, data, or the like outside the sharing account. For example, the share component may allow for computer resources allocated to a sharing account to perform any queries or instructions provided by a foreign account.

In one embodiment, the share component 210 defines a user-defined function that includes procedural logic for determining an overlap count between data stored in a first account and data stored in a second account. The data stored in the first account and the data stored in the second account may be identified by, for example, a resource manager or global services associated with each of the two accounts. The share component 210 may share the user-defined function with the second account such that the second account may run the user-defined function on one or more compute nodes to determine common datapoints between the first account and the second account.

In one embodiment, storage and compute resources for a database system 100 may be logically and/or physically separated. In one embodiment, storage is a common, shared resource across all accounts. Compute resources may be set up independently, per account, as virtual warehouses. In one embodiment, a virtual warehouse is a set of compute nodes that access data in a storage layer and compute a query result. Separating the compute nodes or resources from the storage allows scaling each layer independently. Separation of storage and compute also allows that shared data can be processed independently by different accounts, without the computation in one account affecting the computation in other accounts. That is, in at least some embodiments, there is no contention among computing resources when running queries on shared data.

Figure 3:
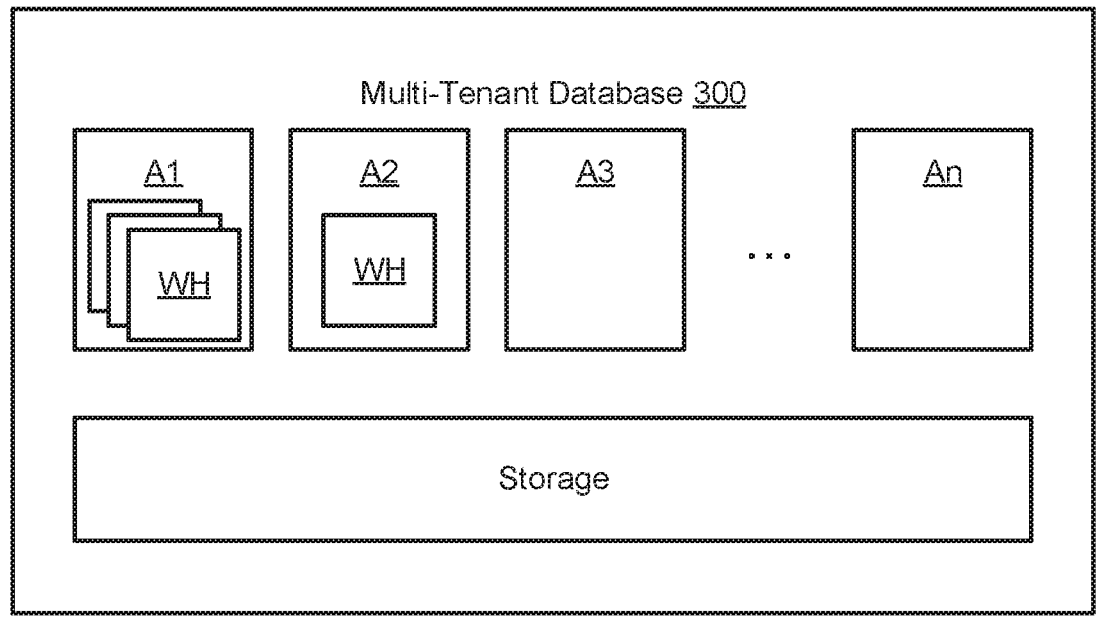
FIG. 3 is a schematic diagram illustrating a multi-tenant database with separation of storage and computing resources, according to one embodiment.

FIG. 3 is a schematic block diagram of a multi-tenant database 300 illustrating separation of storage and computing resources. For example, the multi-tenant database 300 may be a data warehouse where a plurality of different accounts (A1, A2, A3, through An) are hosted. In FIG. 3, account A1 has three virtual warehouses running, account A2 has one virtual warehouse running, and account A3 has no virtual warehouse running. In one embodiment, all these virtual warehouses have access to the storage layer that is separated from the compute nodes of the virtual warehouses. In one embodiment, virtual warehouses can be dynamically provisioned or removed based on a current workload for an account.

In one embodiment, a multi-tenant database system 300 uses object hierarchies in accounts. For example, each customer account may contain object hierarchies. Object hierarchies are often rooted in databases. For example, databases may contain schemas and schemas, in turn, may contain objects such as tables, views, sequences, file formats, and functions. Each of these objects serves a special purpose: tables store relational or semi-structured data; views define logical abstractions over the stored data; sequences provide means to generate ever-increasing numbers; file formats define ways to parse ingested data files; and functions hold user-defined execution procedures. In embodiments as disclosed herein, views may be associated with secure user-defined function definitions such that underlying data associated with the view is hidden from non-owner accounts who have access to the view.

Figure 4:
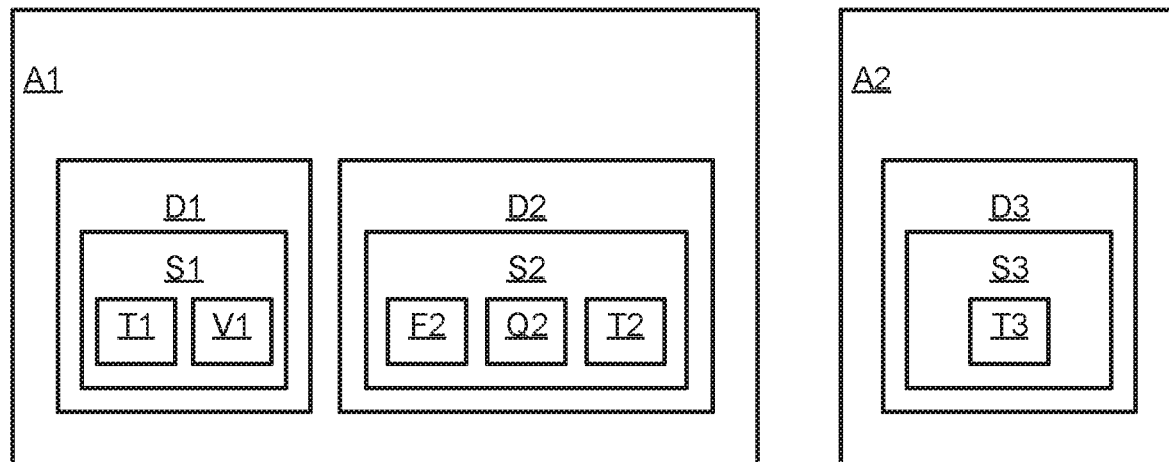
FIG. 4 is a schematic block diagram illustrating object hierarchies, according to one embodiment.

FIG. 4 is a schematic block diagram illustrating object hierarchies within customer accounts. Specifically, accounts may include hierarchies of objects which may be referenced in a database. For example, customer account A1 contains two databases objects D1 and D2. Database object D1 contains schema object S1, which in turn contains table object T1 and view object V1. Database object D2 contains schema object S2, which contains function object F2, sequence object Q2, and table object T2. Customer account A2 contains a database object D3 with schema object S3 and table object T3. The object hierarchies may control how objects, data, functions, or other information or services of an account or database system are accessed or referenced.

In one embodiment, a database system implements role-based access control to govern access to objects in customer accounts. In general, role-based access control consists of two basic principles: roles and grants. In one embodiment, roles are special objects in a customer account that are assigned to users. Grants between roles and database objects define what privileges a role has on these objects. For example, a role that has a usage grant on a database can "see" this database when executing the command "show databases"; a role that has a select grant on a table can read from this table but not write to the table. The role would need to have a modify grant on the table to be able to write to it.

Figure 5:
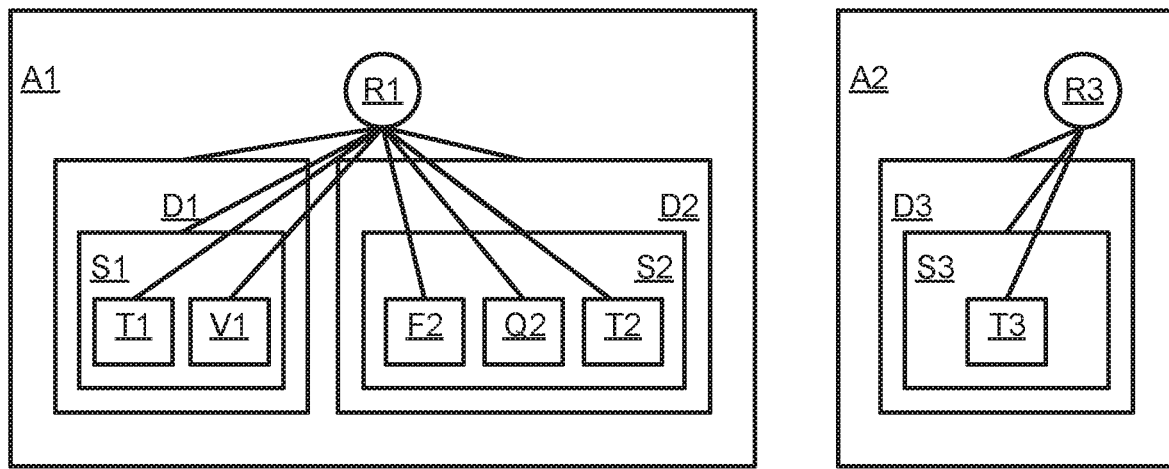
FIG. 5 is a schematic diagram illustrating role-based access, according to one embodiment.

FIG. 5 is a schematic block diagram illustrating role-based access to objects in customer accounts. A customer account A1 contains role R1, which has grants to all objects in the object hierarchy. Assuming these grants are usage grants between R1 and D1, D2, S1, S2 and select grants between R1 and T1, V1, F2, Q2, T2, a user with activated role R1 can see all objects and read data from all tables, views, and sequences and can execute function F2 within account A1. Customer account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

Figure 6:
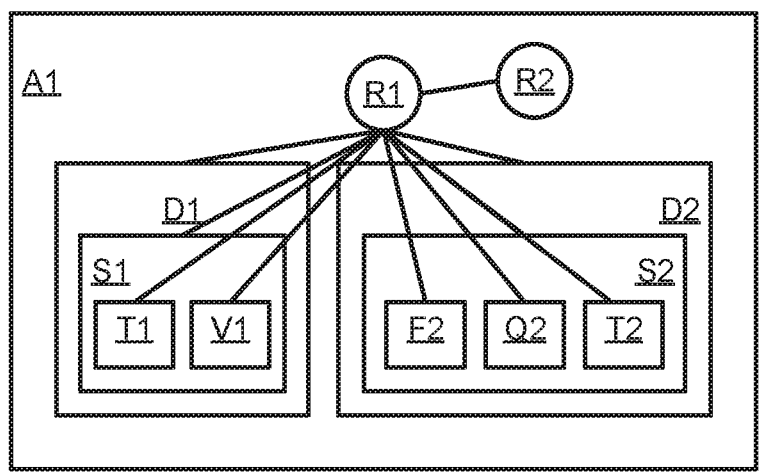
FIG. 6 is a schematic diagram illustrating a usage grant between roles, according to one embodiment.

FIG. 6 illustrates a usage grant between roles. With role-based access control, it is also possible to grant usage from one role to another role. A role that has a usage grant to another role "inherits" all access privileges of the other role. For example, in role R2 has a usage grant on role R1. A user (e.g., with corresponding authorization details) with activated role R2 can see and read from all objects because role R2 inherits all grants from role R1.

Figure 7:
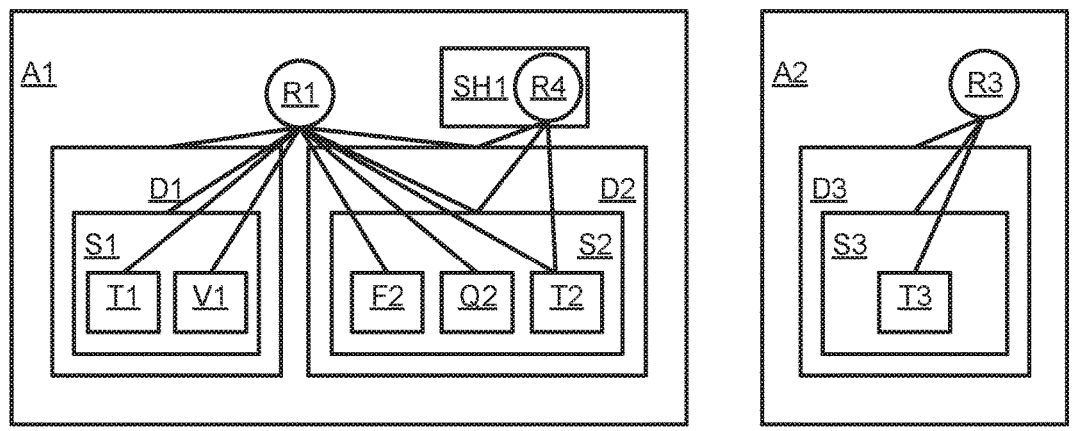
FIG. 7 is a schematic diagram illustrating a share object, according to one embodiment.

FIG. 7 is a schematic block diagram illustrating a share object SH1. In an embodiment, the share object is a column of data across one or more tables and cross-account access rights are granted to the share object such that one or more other accounts may determine common datapoints between data stored in the share object and data stored in the one or more other accounts. Customer account A1 contains share object SH1. Share object SH1 has a unique name "SH1" in customer account A1. Share object SH1 contains role R4 with grants to database D2, schema S2, and table T2. The grants on database D2 and schema S2 may be usage grants and the grant on table T2 may be a select grant. In this case, table T2 in schema S2 in database D2 would be shared read-only. Share object SH1 contains a list of references to other customer accounts, including account A2.

After a share object is created, the share object may be imported or referenced by a target account listed in the share object. For example, importing a share object from a sharer account is possible from other customer accounts. A target account may run a command to list all available share objects for importing. Only if a share object was created with references that included the target account, the target account may list the share object and subsequently import it. In one embodiment, references to a share object in another account are always qualified by account name. For example, target account A2 would reference share SH1 in sharer account A1 with the example qualified name "A1.SH1".

In one embodiment, a process or importing a share object may include: creating an alias object in the target account; linking the alias object with the top-most shared object in the sharer account in the object hierarchy; granting a role in the target account usage privileges to the alias object; and granting the target account role usage privileges to the role contained in the share object.

In one embodiment, a target account that imports the share object or data creates an alias object. An alias object is similar to a normal object in a customer account. An alias object has its own unique name with which it is identified. An alias object may be linked to the top-most object in each object hierarchy that is shared. If multiple object hierarchies are shared, multiple alias objects may be created in the target account. Whenever an alias object is used (e.g., reading from the alias object, writing to the alias object), the alias object is internally replaced by the normal object in the sharer account to which it links. This way, alias objects are merely proxy objects of normal objects, and not duplicate objects. Thus, when reading from or writing to an alias object, the operations affect the original object that the alias links to. Like normal objects, when an alias object is created it is granted to the activated role of the user.

In addition to the alias object, a grant between a role in the target account and the role contained in the share object is created. This is a usage grant from role to role across customer accounts. Role-based access control now allows a user in the target account to access objects in the sharer account.

Figure 8:
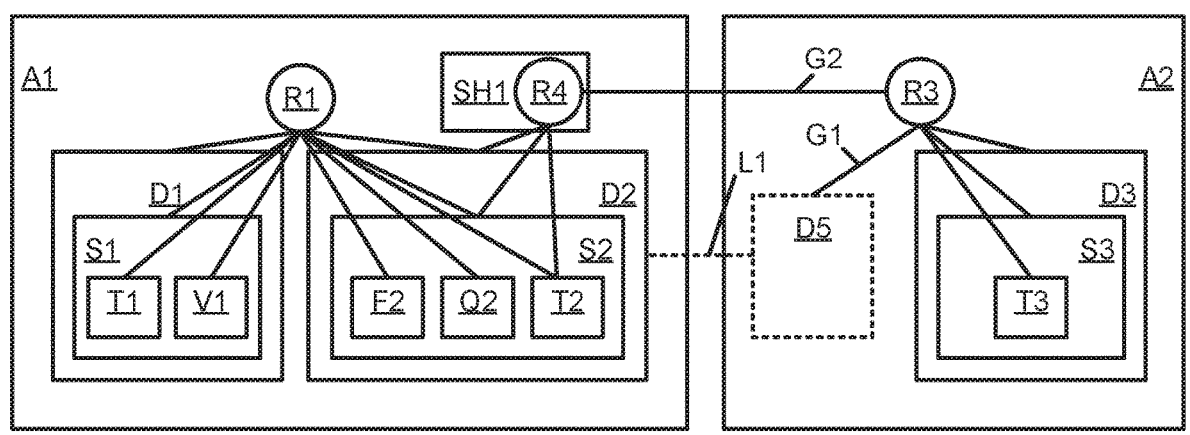
FIG. 8 is a schematic diagram illustrating cross-account grants, according to one embodiment.

FIG. 8 is a schematic block diagram illustrating logical grants and links between different accounts. A database alias object D5 is created in account A2. Database alias D5 references database D2 via link L1. Role R3 has a usage grant G1 on database D5. Role R3 has a second usage grant G2 to role R4 in customer account A1. Grant G2 is a cross-account grant between accounts A1 and A2. In one embodiment, role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2".

Using object aliases and cross-account grants from a role in the target account to a role in the sharer account allows users in the target account to access information in the sharer account. In this way, a database system may enable sharing of data between different customer accounts in an instantaneous, zero-copy, easy-controllable fashion. The sharing can be instantaneous because alias objects and cross-account grants can be created in milliseconds. The sharing can be zero-copy because no data must be duplicated in the process. For example, all queries, or selections can be made directly to the shared object in the sharer account without creating a duplicate in the target account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a sharer account and a second virtual warehouse for a second account, or the sharer account, may process a database query or statement using the shared data of the sharer account.

Figure 9:
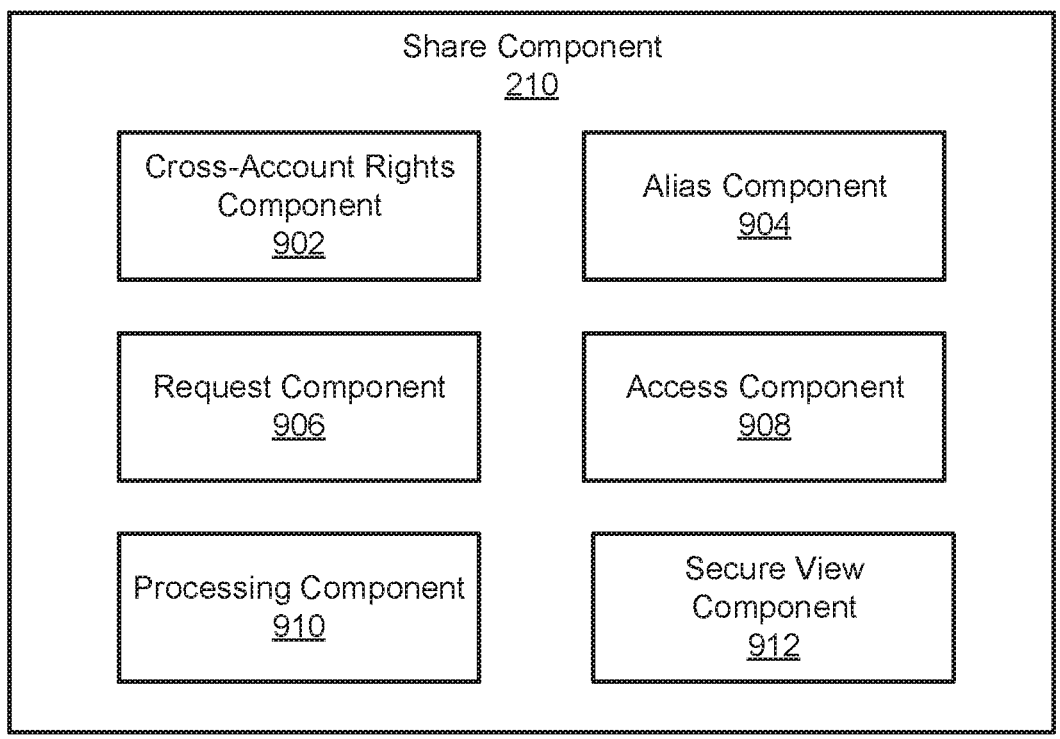
FIG. 9 is a schematic block diagram illustrating components of a share component, according to one embodiment.

FIG. 9 is a schematic block diagram of a share component 210. The share component 210 includes a cross-account rights component 902, an alias component 904, a request component 906, an access component 908, a processing component 910, and a secure view component 912. The components 902-912 are given by way of example only and may not all be included in all embodiments. For example, each of the components 902-912 may be included in or may be implemented as part of a separate device or system.

The cross-account rights component 902 is configured to create and manage rights or grants between accounts. The cross-account rights component 902 may generate a share object in a sharer account. For example, a user of the sharer account may provide input indicating that one or more resources should be shared with another account. In one embodiment, the user may select an option to create a new share object so that resources can be shared with foreign accounts. In response to the user input, the cross-account rights component 902 may create a share object in the sharer account. The share object may include a role to which access rights can be granted to resources for sharing with a foreign account. The foreign account may include a customer account or other account that is separate from the sharer account. For example, the foreign account may be another account hosted on a multi-tenant database system.

Upon creation, the share object may be granted rights to one or more resources within the sharer account. The resources may include a database, a schema, a table, a sequence, or a function of the sharer account. For example, the share object may contain a role (i.e., share role) which is granted right to read, select, query, or modify a data storage object, such as a database. The share object, or share role in the share object, may be granted rights similar to how rights may be granted to other roles using role-based access control. A user may be able to access an account and grant rights to the share role so that the share role can access resources that are meant to be shared with foreign accounts. In one embodiment, the share object may include a list of objects, and an access level, for which the share role has rights.

The share object may also be made available or linked to specific foreign accounts. For example, the share object may store a list of accounts that have rights to the share role or share object in the sharer account. A user with the sharer account may add or remove accounts to the list of accounts. For example, the user may be able to modify the list to control which accounts can access objects shared via the share object. Foreign accounts listed or identified in the share object may be given access to resources with access rights granted to a share role of the share object. In one embodiment, a specific account can perform a search to identify share objects or sharer accounts that have been shared with the specific account. A list of available share objects can be viewed by a user of the target or specific account.

The alias component 904 is configured to generate an alias for data or a data object shared by a separate account. For example, the alias object may create, in a target account, an alias object corresponding to a shared resource shared by a sharer account. In one embodiment, the alias object is created in response to a target account accepting a shared resource or trying to access a shared resource for the first time. The alias object may act as an alias for a data object for the highest object hierarchy shared by the sharer account (see, e.g., FIG. 8 where D5 is an alias for D2). The alias component 904 may also generate a link between the alias object and a shared object (see, e.g., FIG. 8 where L1 is the link between D5 and D2). The link may be created and/or stored in the form of an identifier or name of the original or "real" object. For example, the link L1 in FIG. 8 may include an identifier for D2 stored in the alias object D5 that includes a unique system wide name, such as "A1.D2".

The alias component 904 may also grant a role in the target account (the account with which the sharer account has shared data or resources) access rights to the alias object (see, e.g., G1 of FIG. 8). Additionally, the alias component 904 may also grant the role in the target account to a share role in the share object of the sharer account (see, e.g., G2 of FIG. 8). With the alias object created, a link between the alias object and an object in the sharer account, and grants to a role in the target account, the target account may be free to run queries, statements, or "see" shared data or resources in the sharer account.

The request component 906 is configured to receive a request from an account to access a shared resource in a different account. The request may include a database query, select statement, or the like to access a resource. In one embodiment, the request includes a request directed to an alias object of the requesting account. The request component 906 may identify a resource with which the alias object is linked, such as a database or table in a sharer account. The request component 906 may identify the linked object based on an identifier of the alias object.

The request component 906 may further be configured to receive a request from an account to count common datapoints between two accounts. The request component 906 may be associated with a first account and may receive a request from a second account to generate a secure join between the two accounts and determine how many, and which, datapoints are shared between the two accounts. The datapoints may be of a single subject matter or column identifier or may be of multiple subject matters.

The access component 908 is configured to determine whether an account has access to a shared resource of a different account. For example, if a first account requests access to a resource of a different, second account, the access component 908 may determine whether the second account has granted access to the first account. The access component 908 may determine whether a requesting account has access by determining whether a share object identifies the requesting account. For example, the access component 908 may check if the requesting account is present in a list of accounts stored by a share object. The access component 908 may also check whether the share object that identifies the requesting account has access rights (e.g., grants) to the targeted data resource in the sharer account.

In one embodiment, the access component 908 may check for the presence of a grant from a share role in a sharer account to a requesting role in the requesting account. The access component 908 may check whether a link exists between an alias object to which a database request or statement was directed or whether a grant exists between a requesting role and the alias object. For example, the access component 908 may check for the existence or presence of one or more of L1, G1 and G2 illustrated in FIG. 8. Furthermore, the access component 908 may check for a grant between a role in a share object to an object (such as a table or database) of the sharer account. For example, the access component 908 may check for the existence of a grant between the role R4 and the database D2 in FIG. 8. If the access component 908 determines that the requesting account has access to the shared resource, the request may be fulfilled by the share component 210 or a processing component 910. If the access component 908 determines that the requesting account does not have rights to the requested data or object, the request will be denied.

The processing component 910 is configured to process database requests, queries, or statements. The processing component 910 may process and provide a response to a request from an account to access or use data or services in another account. In one embodiment, the processing component 910 provides a response to a request by processing the request using original data in a sharer account that is different from the requesting account. For example, the request may be directed toward a database or table stored in or for a first account and the processing component 910 may process the request using the database or table of the first account and return a response to a requesting, second account.

In one embodiment, the processing component 910 performs processing of shared data without creating a duplicate table or other data source in the requesting account. Generally, data must be first ingested into an account that wishes to process that data or perform operations against the data. The processing component 910 may save processing time, delay, and/or memory resources by allowing a target account to access shared resources in a sharer account without creating a copy of a data resource in the target account.

The processing component 910 may perform processing of the same data using different processing resources for different accounts. For example, a first virtual warehouse for a first account may process a database query or statement using data shared by a sharer account and a second virtual warehouse for a second account, or the sharer account, may process a database query or statement using the shared data of the sharer account. Using separate processing resources to process the same data may prevent contention for processing resources between accounts. The processing resources may include dynamically provisioned processing resources. In one embodiment, processing of shared data is performed using a virtual warehouse for the requesting account even though the data may be in storage for a different account.

The secure view component 912 is configured to define a secure view for a share object, a data field of a share object, a data field of a database object, and so forth. In an embodiment, the secure view component 912 defines the secure view using a SECURE keyword in a view field and may set or unset the SECURE property on a view using an ALTER VIEW command. In various embodiments, the secure view component 912 may implement such commands only at the manual direction of a client account or may be configured to automatically implement such commands. The secure view component 912 may alter the parser to support the secure keyword before the view name and the new alter view rule. In an embodiment, the alter view rule may be more general to incorporate further view-level attributes. In terms of metadata support, the vies may effectively be stored as tables, and the change may involve altering a table data persistence object that includes a secure flag indicating whether the view is a secure view (this may be implemented in addition to the view text comprising the secure tag). The secure user-defined function definition (i.e. the table data persistence object) may be hidden from users that are not the owner of the view. In such an embodiment, a command to show views will return results as usual to the owner of the view but will not return the secure user-defined function definition to a non-owner second account that has access to the view.

The secure view component 912 may alter transformations of a parse tree, e.g. view merging and predicate information. The canonical implementation may include annotating query blocks such that the query blocks are designated as coming from secure view. In such an implementation, the query blocks cannot be combined with external query blocks (e.g. view merging) or expressions (e.g. via filter pushdown).

The secure view component 912 may rewrite the query plan tree during optimization e.g. during filter pullup and/or filter pushdown. The secure view component 912 may be configured to ensure that no expression that does not stem from a secure view can be pushed down below the view boundaries. The secure view component 912 may be configured to achieve this by implementing a new type of projection that behaves identically to a standard projection but, since it is not a standard projection, fails to match any of the rewrite rule preconditions. As a result, the relevant rewrites are not applied. The secure view component 912 may be configured to identify what type of projection is to be generated (e.g. a standard projection or a secure projection) after query blocks have been designated as coming from a secure user-defined function definition or not.

The secure view component 912 is configured to optimize performance for secure views in a zero-copy data sharing system. In various embodiments known in the art, secure views are known to cause a loss of performance that may effectively cripple the optimizer from applying certain transformations. Such embodiments might be improved by deeming certain transformations as safe, where safety indicates that the operations being transformed will not have any side effects on the system. Such side effects may be caused by a user defined function (UDF) that performs operations that cannot readily identify unsafe operations, or operations that can fail and reveal information about the data value that caused the failure (e.g. when dividing by zero or some similar operation). The secure view component 912 may annotate expressions with the expression's safety properties and then enable transformations that allow an expression to be pushed through a secure view boundary if the expression is deemed safe. The expression may be deemed safe if the expression is known to produce no errors and the expression does not contain a user defined function (UDF). The secure view component 912 may determine whether the expression produces errors by utilizing an expression properties framework where the expression properties store an indication whether an expression may produce errors.

Figure 10:
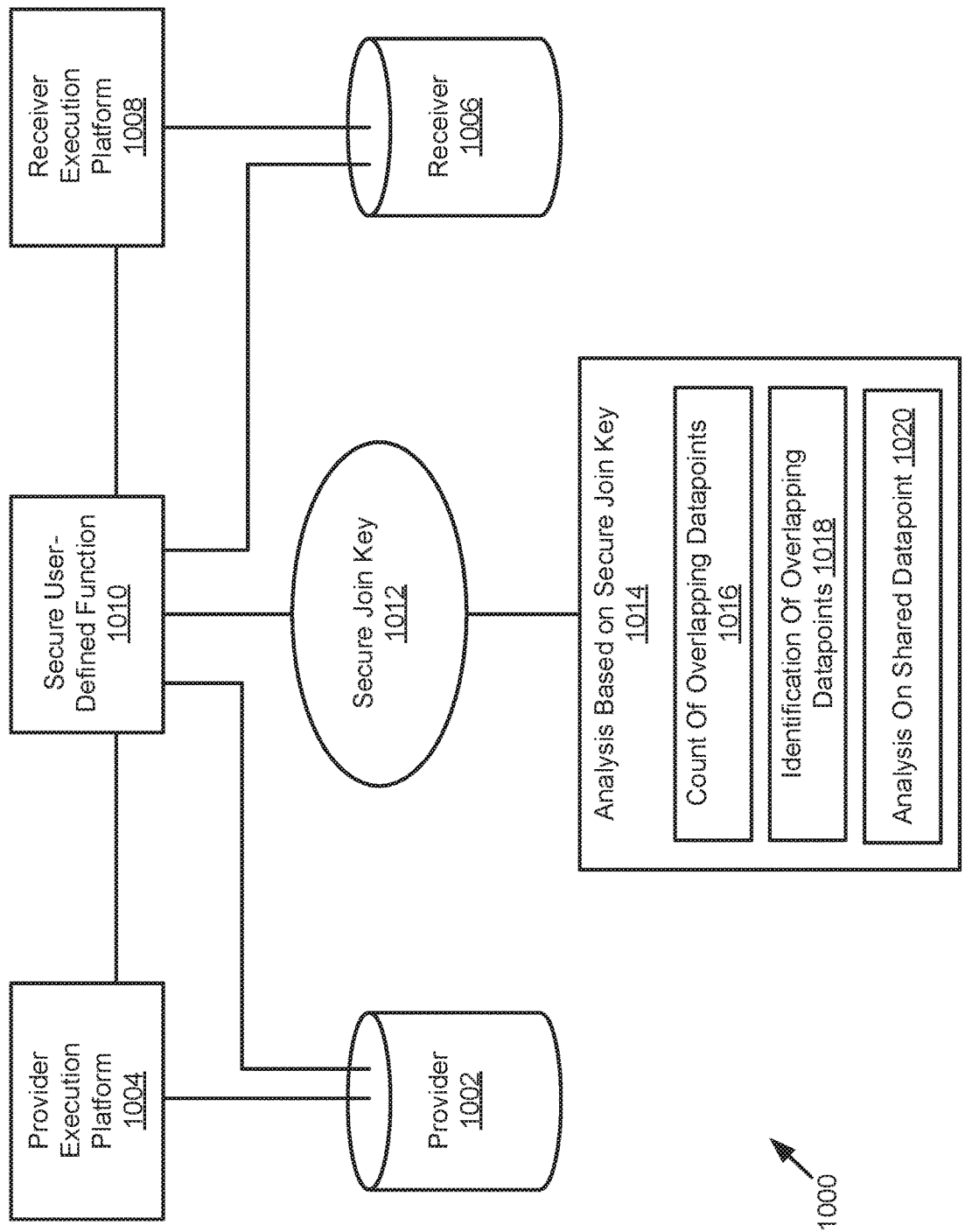
FIG. 10 is a schematic diagram of a system for generating a secure join across database accounts, according to one embodiment.

FIG. 10 is a schematic diagram of a system 1000 for generating a secure join between two accounts. The secure join takes place between a provider 1002 and a receiver 1006. It should be appreciated that the terms "provider" and "receiver" are illustrative only and may alternatively be referred to as a first account and a second account, as a sharer account and a target account, as a provider and a consumer, and so forth. In an embodiment, the provider 1002 and the receiver 1006 are different accounts associated with the same cloud-based database administrator. In an embodiment, the provider 1002 and the receiver 1006 are associated with different cloud-based and/or traditional database systems. The provider 1002 includes a provider execution platform 1004 having one or more execution nodes capable of executing processing tasks on the database data of the provider 1002, wherein the database data is stored in a data store associated with the provider 1002. Similarly, the receiver 1006 includes a receiver execution platform 1008 having one or more execution nodes capable of executing processing tasks on the database data of the receiver 1006, wherein the database data is stored on a data store associated with the receiver 1006. The data store may include cloud-based scalable storage such that the database data is spread across a plurality of shared storage devices accessible by an execution platform such as 1004 or 1008. The secure join between the provider 1002 and the receiver 1006 is implemented with a secure user-defined function 1010 ("secure UDF"). The secure UDF 1010 includes programming logic and/or a hash key for generating a secure join key 1012. The secure UDF 1010 may be generated by the provider 1002, the receiver 1006, a database administration system, and/or a third party. The secure UDF 1010 may be run on the provider execution platform 1004 and/or the receiver execution platform 1008. In an embodiment, the secure UDF 1010 is only run on the receiver execution platform 1008 and the provider 1002 has no visibility into whether or when the secure UDF 1010 was run by the receiver 1006.

In an embodiment, the secure UDF 1010 is defined by the provider 1002 and made available to the receiver 1006. The secure UDF 1010 is configured to generate the secure join key 1012 for joining data associated with the provider 1002 with data associated with the receiver 1006. The secure join key 1012 is a hash string. In an embodiment, the secure join key 1012 is a one-way hash that cannot be read by either of the provider 1002 or the receiver 1006 to discern the original data. The secure join key 1012 includes data from the provider 1002 and data from the receiver 1006. In an embodiment, the data from the provider 1002 and/or the data from the receiver 1006 is salted before running the secure UDF 1010 to generate the secure join key 1012. In such an embodiment, the salted value is hashed by the secure UDF 1010 and cannot be read by the other party. In an embodiment, a database administrator implements the secure UDF 1010 to generate the secure join key 1012 and the database administrator is solely capable of reverting the secure join key 1012 to the original data. This introduces additional security benefits that may be necessary in certain implementations, for example where the data includes sensitive information such as personally identifiable information and/or personal health information.

In an embodiment, the original data from the provider 1002 and/or the original data from the receiver 1006 is salted before the secure join key is generated. The salt may include any information or characters that are only known to the owner of the data, i.e. the provider 1002 or the receiver 1006. A salted datapoint may include the original datapoint with a salt adhered to it. By way of example, if the original datapoint is a customer's name such as "Susan," the salted datapoint may read something like "SusanSALT123" where "SALT123" represents any string of characters (i.e., the salt) that is known only by the owner of the data. In an embodiment, the salt may be known to the owner of the data and may further be known to a database system or provider that is responsible for generating the secure join key, implementing the secure UDF, and/or storing database data.

In an embodiment, the secure UDF 1010 is in communication with and can access the data of the provider 1002 and is run on the receiver execution platform 1008. The secure UDF 1010 includes hashing code and generates the secure join key 1012. The secure UDF 1010 performs the on-way hash on the provider's 1002 data to generate the secure join key 1012. In an embodiment, an additional secure user-defined function is configured to perform analysis at 1014 that is based on the secure join key. Example analyses that may be performed based on the secure join key 1012 includes a count of overlapping datapoints at 1016, an identification of overlapping datapoints at 1018, and/or an analysis on shared datapoints at 1020. A number of different analyses may be performed to determine similarities or differences between the provider's 1002 data and the receiver's 1006 data. Each of the different analyses may be performed by a different secure user-defined function that may be programmed by the provider 1002, the receiver 1006, a third party, a system administrator, and so forth.

The system 1000 is configured such that neither of the provider 1002 nor the receiver 1006 has any visibility into the original data stored in the other account. The original data is hashed by the secure UDF 1010 using a one-way hash such that the original data is converted into an unidentifiable stream of hashed data and cannot be reverted by the provider 1002 or the receiver 1006 to determine the original data.

An additional secure user-defined function may perform any of the one or more analyses based on the secure join key at 1014. In an embodiment, a secure user-defined function performs a count of overlapping datapoints based on the hashed streams that make up the secure join key 1012. The secure UDF 1010 may generate a separate hash stream of data from the provider 1002 and data from the receiver 1006, and the collective hash streams may be referred to as the secure join key 1012. The secure user-defined function that is configured to perform the count of overlapping datapoints may perform a row-by-row count or a bulk count to determine how many and which datapoints are the same between the provider 1002 and the receiver 1006. This secure user-defined function may be configured to return only a yes/no answer for each pair of hashed datapoints to determine whether the pair of hashed datapoints is the same and therefore the provider 1002 and the receiver 1006 have a matching original datapoint. This secure user-defined function may return a listing of the identities of all matching datapoints and/or a total count of how many matching datapoints exist between the provider 1002 and the receiver 1006.

Figure 11:
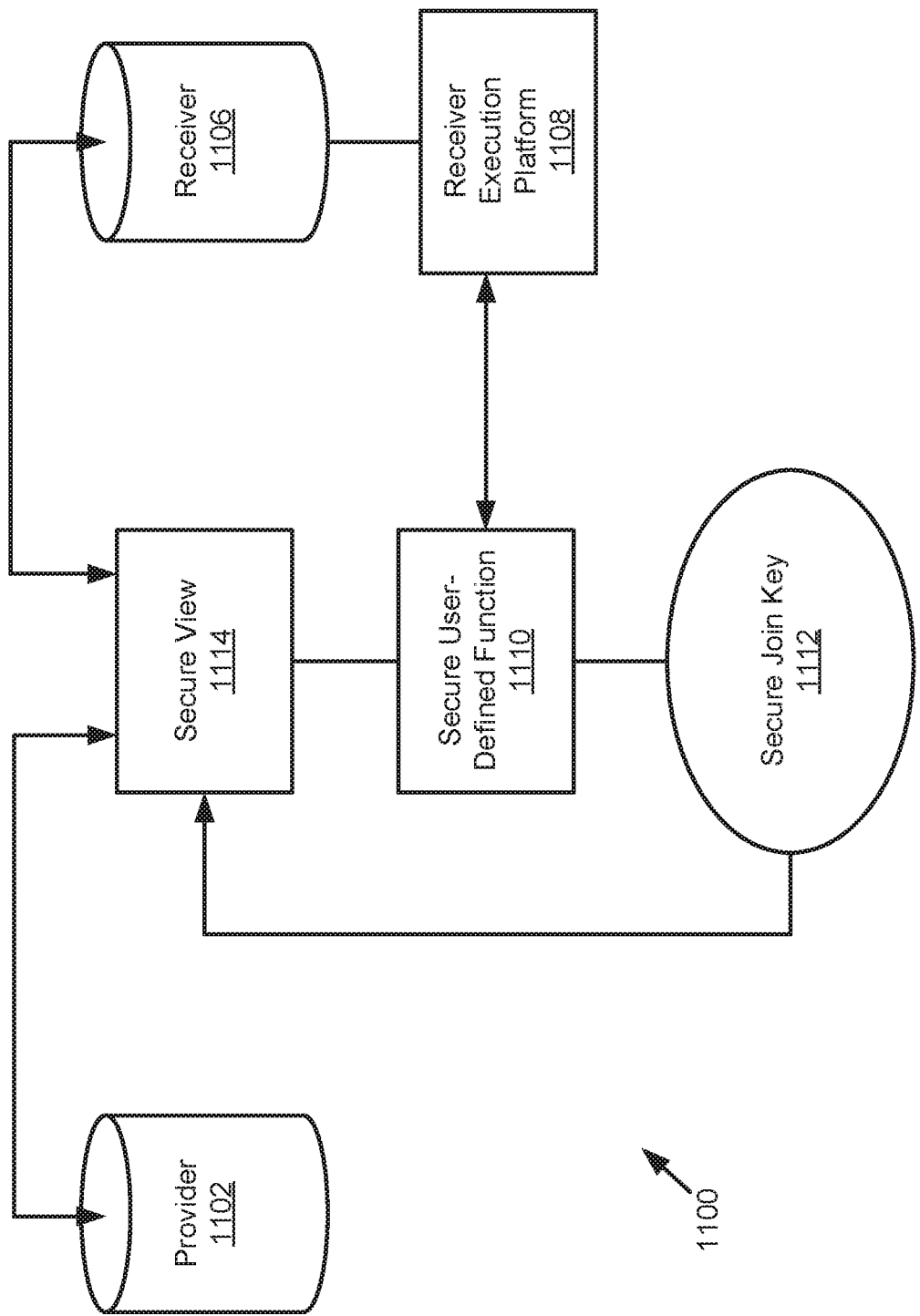
FIG. 11 is a schematic diagram of a system for generating a secure join across database accounts, according to one embodiment.

FIG. 11 is a schematic diagram of a system 1100 for a reverse share secure join between a provider 1102 and a receiver 1106. The reverse share provides a secure option for the receiver 1106 to generate a secure view 1114 of its data that may be provided to the receiver 1106 such that the receiver 1106 may run a secure user-defined function 1110 ("secure UDF") on the provider's 1102 data. The secure UDF 1110 includes hashing code such that it is configured to take data from the provider 1102 and/or the receiver 1106 and hash the data to generate a secure join key 1112. The secure join key 1112 may be used to perform various analyses on the provider's 1102 and the receiver's 1106 data, such as to determine how many and which datapoints are common between the provider 1102 and the receiver 1106.

In an embodiment, the secure UDF 1110 is only run on the receiver execution platform 1108 and is not run on any compute nodes owned or operated by the provider 1102. In such an embodiment, the provider 1102 has no visibility into whether or when the secure UDF 1110 was run by the receiver. In the system 1100, the secure UDF 1110 may be defined by the provider 1102, by the receiver 1106, by a third party, or by a database system administrator or database provider. The secure UDF 1110 generates the secure join key 1112 by hashing data from the provider 1102 and the receiver 1106.

In a reverse share as illustrated in FIG. 11, the data provided to the secure UDF 1110 may be salted. The salted data may be hashed to generate the secure join key 1112. This provides additional security benefits so the other party cannot determine the original data. For example, the provider 1102 may adhere a salt to each of its datapoints and provide those salted datapoints to the secure view 1114 to be read by the secure UDF 1110. When the secure UDF 1110 hashes the salted data points to generate the secure join key 1112, each datapoint will have additional characters that have also been hashed. This hash string includes the original data and the salt, and both have been hashed such that the other party (the receiver 1106) cannot determine the provider's 1102 actual data.

For example, the provider 1102 and the receiver 1106 may be accounts associated with retail business. The two business may have stored their customer base on a database and may wish to determine how many and which customers the two business have in common. The customer base may include personal identifiable information about each customer, such as name, address, telephone number, and so forth. Each business (the provider 1102 and the receiver 1106) may have an agreement with their customers to ensure such information remains private. Additionally, the provider 1102 and the receiver 1106 may not wish the other party to know who their customers are and may only wish to know how many customers they have in common. In the example, the provider 1102 may define the secure UDF 1110 with hashing code such that the secure UDF 1110 can generate a secure join key 1112. The secure join key is an unidentifiable hash string of the provider's 1102 data and the receiver's data 1106. The secure UDF 1110 may be run on the receiver execution platform 1108 such that the provider 1102 does not have any visibility into when or if the secure UDF 1110 was run. The provider 1102 may salt its data values to further disguise the original data from the receiver. For example, one datapoint owned by the provider 1102 may be a telephone number associated with one of the provider's 1102 customers. The provider 1102 may salt the telephone number (e.g. 801-555-5555) by adding a "salt" to the telephone number. The salted telephone number may have any characters added to it to disguise the original datapoint. By way of example, the salted telephone number may read SALT1238015555555SALT987. It should be appreciated that the salt added to the datapoints may be any suitable string of characters and may be known only by the salting party. The provider 1102 may provide the salted data values to the receiver 1106 by way of the secure view 1114. The provider's 1102 salted data values will be hashed to generate the secure join key 1112. Because the receiver 1106 does not have any knowledge of the salt, the receiver 1106 cannot discern any of the original data values by de-hashing the secure join key 1112. The receiver 1106 may run the secure UDF 1110 on the receiver execution platform 1108 to generate the secure join key 1112, and the receiver 1106 may further run one or more additional user-defined functions to analyze the data that is hashed in the secure join key 1112. The receiver 1106 may wish to know, for example, how many customers the parties have in common, which customers the parties have in common, and so forth.

In an embodiment as illustrated in FIG. 11, the receiver 1106 salts its data and may further hash its data before providing the data to the secure UDF 1110. The receiver 1106 may provide salted hash values of its data to the secure UDF 1110 that was defined by the provider 1102. The secure UDF 1110 generates the secure join key 1112 based on hashing code and on the salted hash values received from the receiver 1106. The secure join key 1112 may be provided to the provider 1102 by way of the secure view 1114.

In an embodiment, the receiver 1106 may include additional salted hash values that do not represent any real receiver datapoints. This may prevent the provider 1102 from deducing anything about the size of the receiver's 1106 actual datastore by inspecting the contents of the reverse share. This technique may be referred to as "noise injection" and does not harm analytics performed on the data such as the count of common datapoints between the provider 1102 and the receiver 1106.

Figure 12:
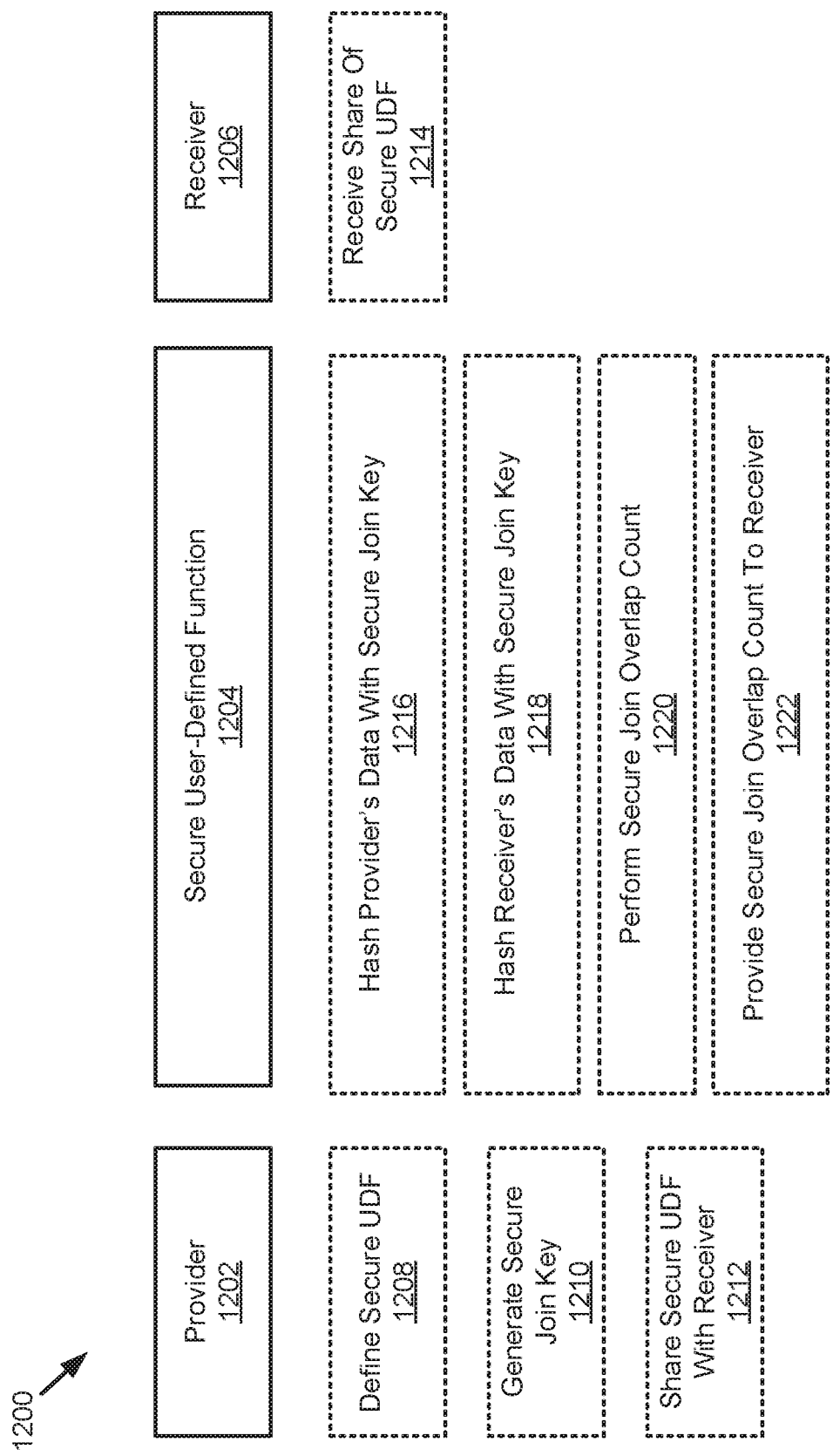
FIG. 12 is a schematic block diagram of work distribution for generating a secure join across database accounts, according to one embodiment.

FIG. 12 is a schematic block diagram of an exemplary embodiment of work distribution 1200 for a secure join between a provider 1202 and a receiver 1206. The work distribution 1200 is split amongst the provider 1202, the secure user-defined function (UDF) 1204, and the receiver 1206. In an embodiment, the secure UDF 1204 is run on an execution platform belonging to the receiver 1206. The secure UDF 1204 may be defined by the provider 1202 as shown in FIG. 12 or it may be defined by the receiver 1206, a third party, a database provider, a database administrator, and so forth. When the secure UDF 1204 is run on an execution platform associated with the receiver, the provider may be prohibited from knowing whether or when the secure UDF 1204 was run.

The provider 1202 defines at 1208 the secure UDF and generates at 1210 a secure join key. The provider 1202 shares at 1212 the secure UDF with the receiver. The receiver 1206 receives at 1214 the share of the secure UDF from the provider 1202. The secure UDF 1204 hashes at 1216 the provider's data using the secure join key. The secure UDF 1204 hashes at 1218 the receiver's data with the secure join key. The secure UDF 1204 performs at 1220 a secure join overlap count between the hashed provider's data and the hashed receiver's data. The secure UDF 1204 provides at 1222 the secure join overlap count to the receiver.

Figure 13:
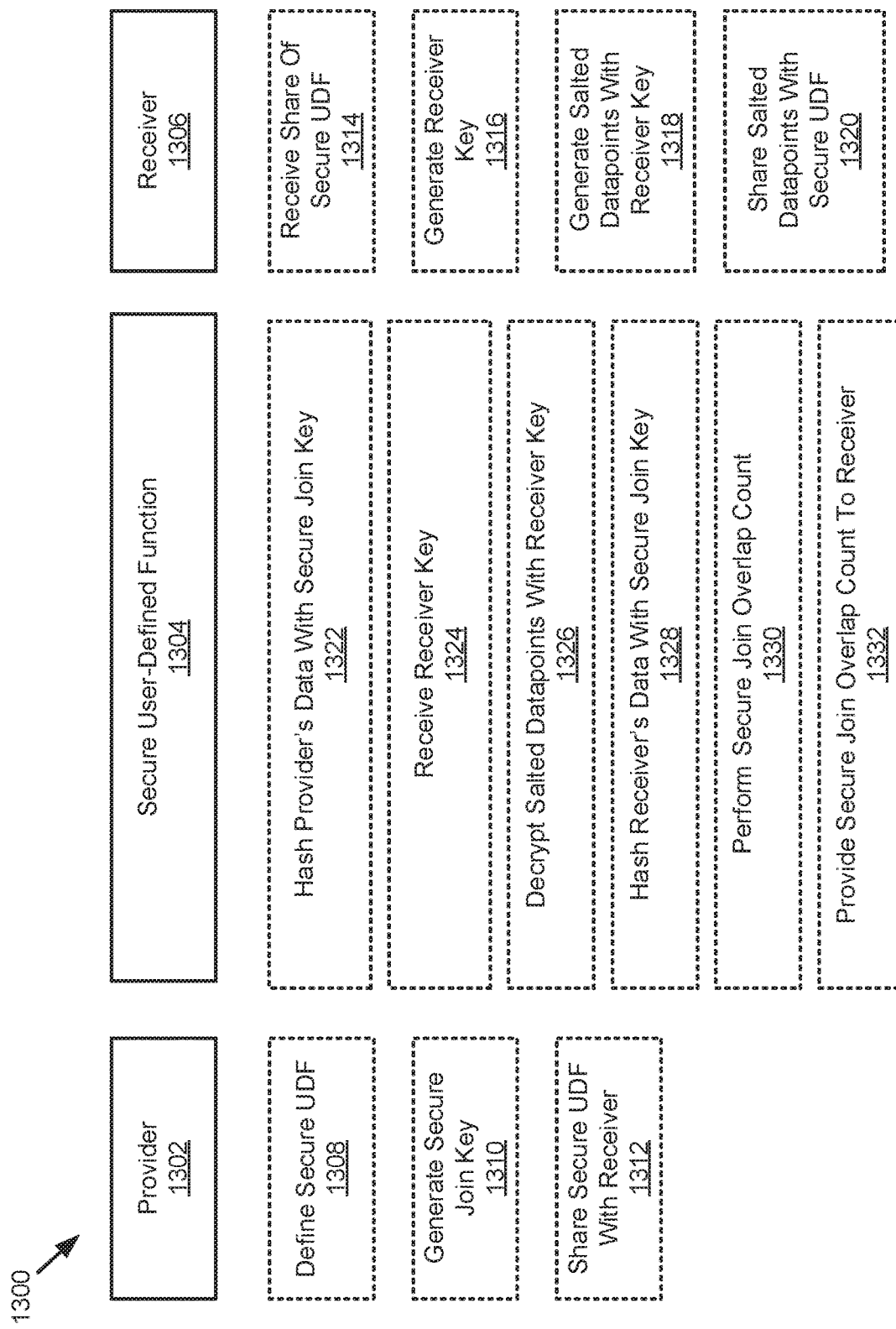
FIG. 13 is a schematic block diagram of work distribution for generating a secure join across database accounts, according to one embodiment.

FIG. 13 is a schematic block diagram of an exemplary embodiment of work distribution 1300 for a reverse share secure join between a provider 1302 and a receiver 1306. The work distribution 1300 is split amongst the provider 1302, the receiver 1306, and a secure user-defined function (UDF) 1304. The secure UDF 1304 is run on an execution platform belonging to the receiver 1306. When the secure UDF 1304 is run on an execution platform associated with the receiver 1306, the provider 1302 may be prohibited from knowing whether or when the secure UDF 1304 was run.

The provider 1302 defines at 1308 a secure UDF definition. Defining the secure UDF definition includes generating at 1310 a secure join key. The provider 1302 shares at 1312 the secure UDF including the secure join key generator with the receiver 1306. The receiver 1306 receives at 1314 the share of the secure UDF. The receiver 1306 generates at 1316 a receiver key that may include a hash key. The receiver 1306 generates at 1318 salted datapoints using the receiver key. The receiver 1306 shares at 1320 the salted datapoints with the secure UDF. The secure UDF 1304 hashes at 1322 the provider's data using the secure join key. The secure UDF 1304 receives at 1324 the receiver key and decrypts at 1326 the salted datapoints with the receiver key. The secure UDF 1304 hashes at 1328 the receiver's data using the secure join key. The secure UDF 1304 performs at 1330 a secure join overlap count of the hashed provider's data and the hashed receiver's data. The secure UDF 1304 provides at 1332 the secure join overlap count to the receiver. The secure UDF 1304 may further provide the secure join overlap count to the provider.

Figure 14:
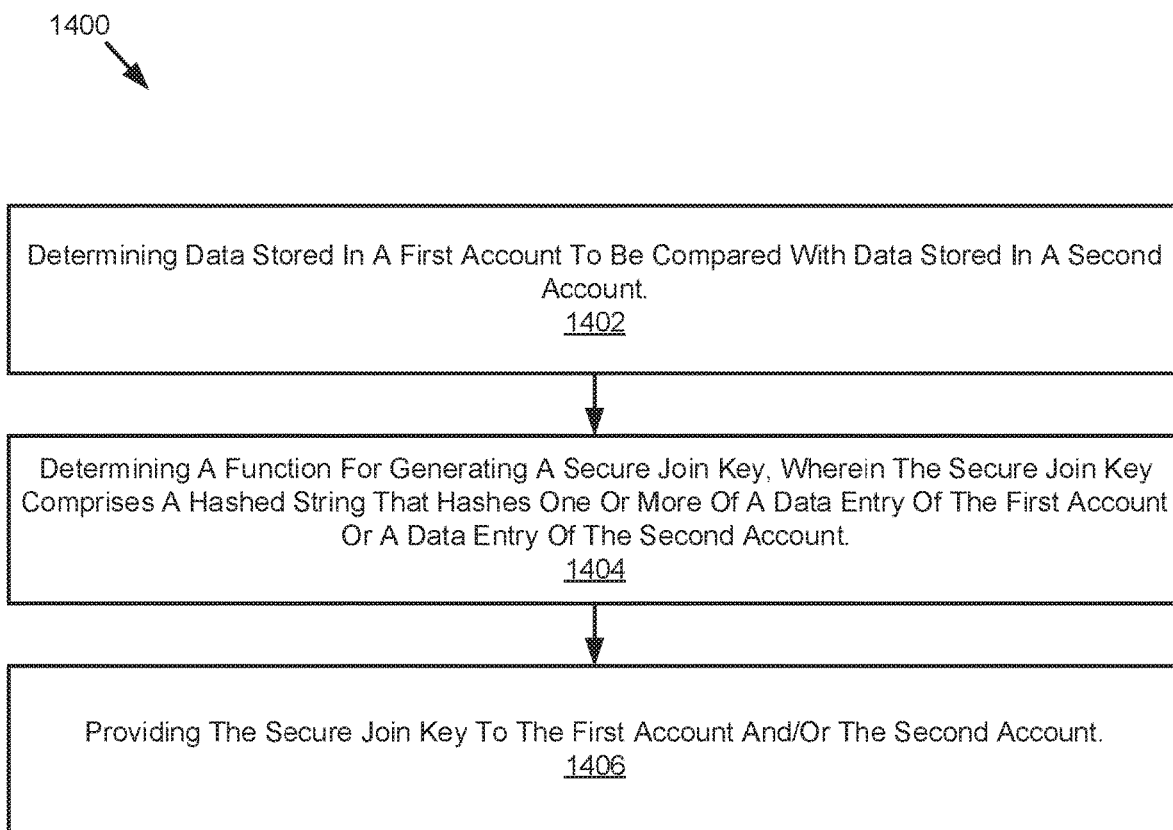
FIG. 14 is a schematic block diagram illustrating a method for generating a secure join across database accounts, according to one embodiment.

FIG. 14 is a schematic flow chart diagram of a method 1400 for generating a secure join of database data. The method 1400 may be implemented in a multi-tenant database system such as that illustrated in FIG. 1. The method may be performed by any suitable computing device such as a share component 210 as disclosed herein.

The method 1400 begins and the computing device determines at 1402 data stored in a first account to be compared with data stored in a second account. The data stored in the first account and the data stored in the second account may be directed to the same subject matter. In an exemplary implementation, the first account and the second account may be associated with the same multi-tenant database system and may represent different client accounts within that multi-tenant database system. The first account and the second account may wish to determine all common datapoints of a certain subject matter between the two accounts. For example, the first account and the second account may be associated with companies wishing to determine all customers that the two companies have in common. The companies may be storing customer data with certain personally identifiable information such as, for example, a telephone number for each customer, a social security number for each customer, an address for each customer, and so forth. Such personally identifiable information may be sensitive and should not be shared with any entity or person outside of the company to which the customer provided the information. In this implementation, the two companies may wish to securely compare all datapoints of a certain type, such as all customer phone numbers, all customer social security numbers, all customer addresses, and so forth. The companies may wish to compare such datapoints without permitting the other company to view the personally identifiable information for any customers and/or a total number of customers. The method 1400 continues and the computing device determines at 1404 a function for generating a secure join key, wherein the secure join key comprises a hashed string that hashes one or more of a data entry of the first account or a data entry of the second account. The function may be defined by either of the first account or the second account, a third party, or a database administrator or provider. The method 1400 continues and the computing devices provides at 1406 the secure join key to the first account and/or the second account.

Figure 15:
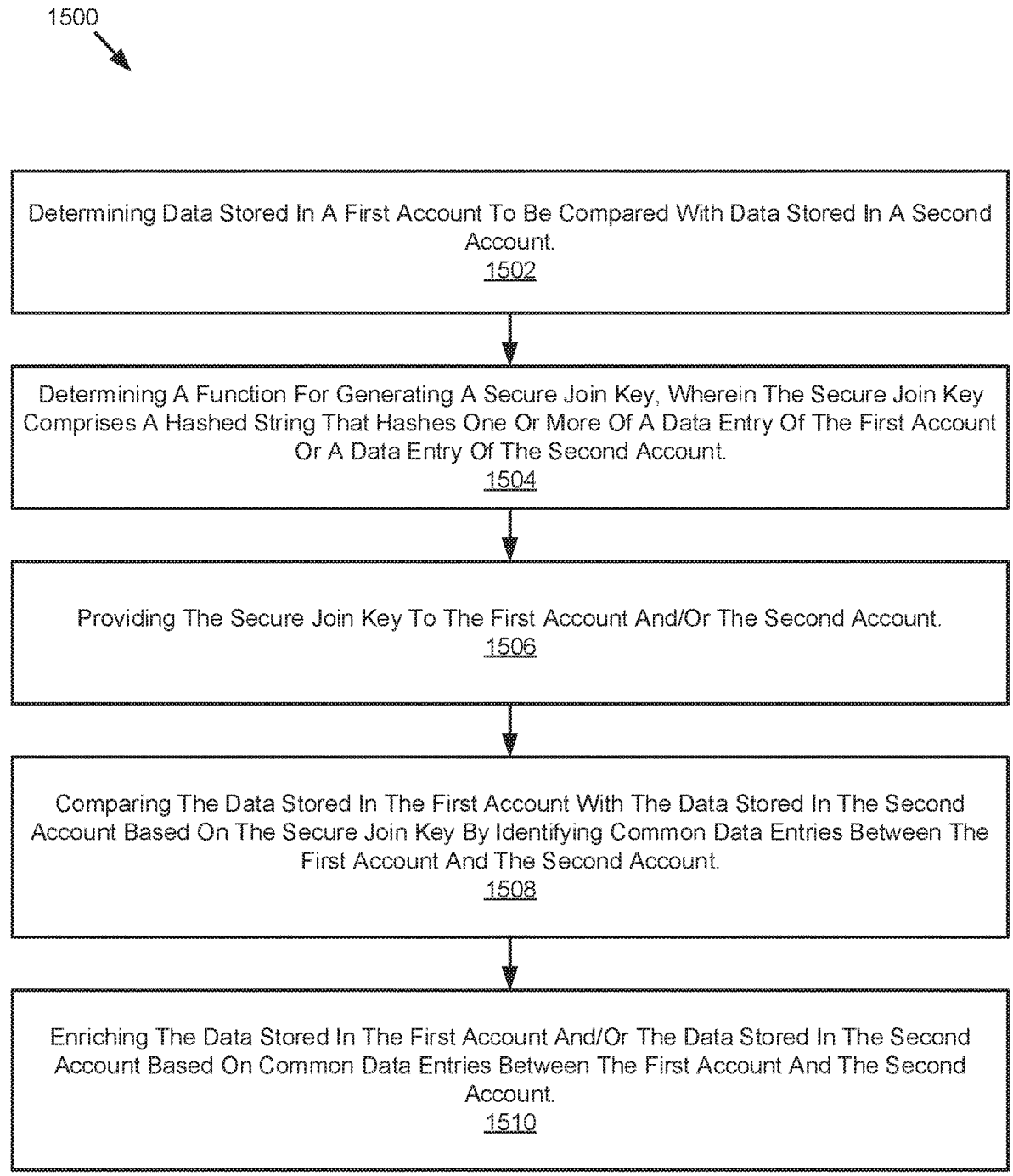
FIG. 15 is a schematic block diagram illustrating a method for generating a secure join across database accounts, according to one embodiment.

FIG. 15 is a schematic flow chart diagram of a method 1500 for generating a secure join of database data. The method 1500 may be implemented in a multi-tenant database system such as that illustrated in FIG. 1. The method may be performed by any suitable computing device such as a share component 210 as disclosed herein.

The method 1500 begins and the computing device determines at 1502 data stored in a first account to be compared with data stored in a second account. The computing device determines at 1504 a function for generating a secure join key, wherein the secure join key comprises a hashed string that hashes one or more of a data entry of the first account or a data entry of the second account. The computing device provides at 1506 the secure join key to the first account and/or the second account. The computing device compares at 1508 the data stored in the first account with the data stored in the second account based on the secure join key by identifying common data entries between the first account and the second account. The computing device enriches at 1510 the data stored in the first account and/or the data stored in the second account based on common data entries between the first account and the second account.

Figure 16:
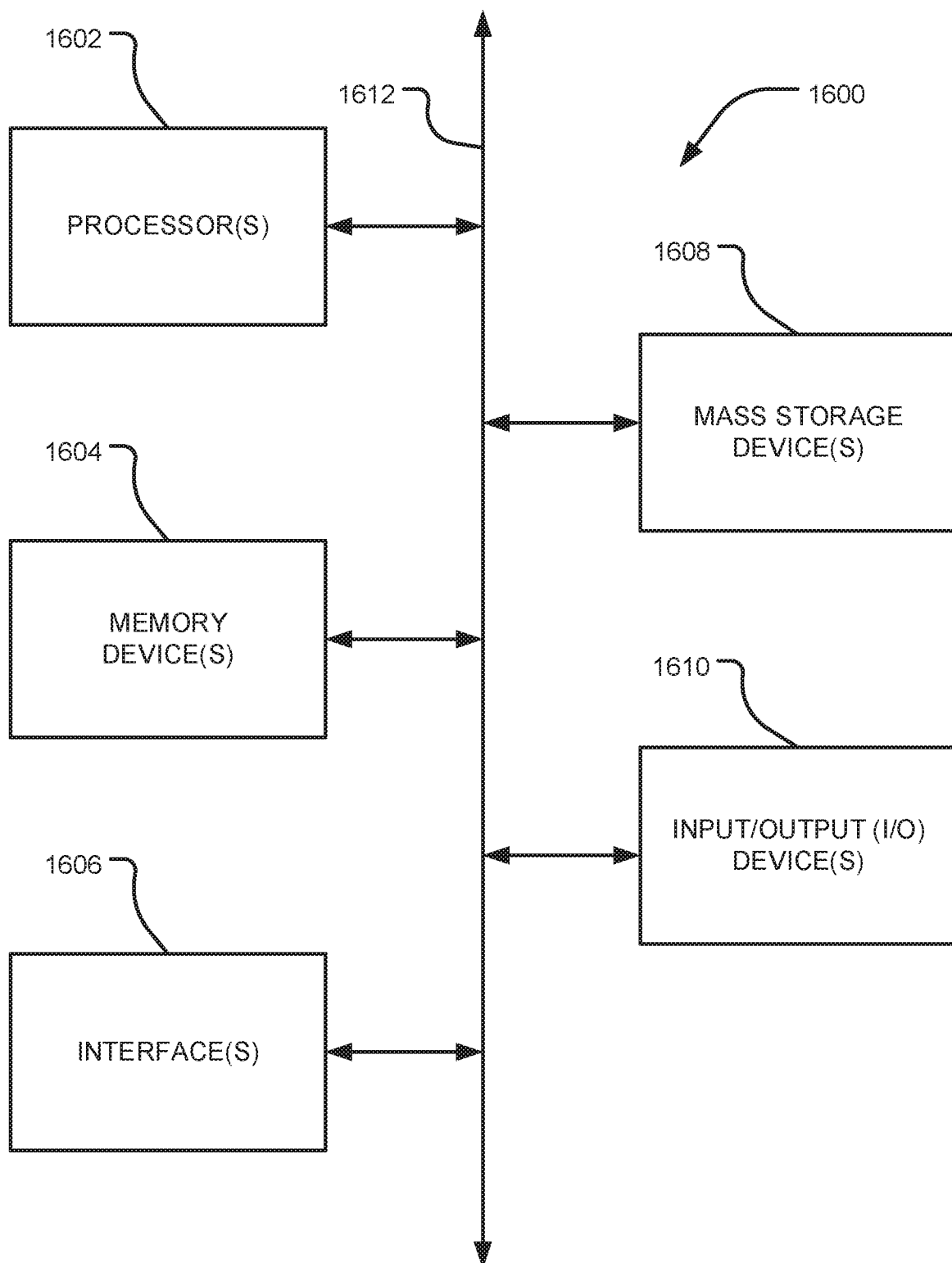
FIG. 16 is a block diagram depicting an example computing device or system consistent with one or more embodiments disclosed herein.

FIG. 16 is a block diagram depicting an example computing device 1600. In some embodiments, computing device 1600 is used to implement one or more of the systems and components discussed herein. Further, computing device 1600 may interact with any of the systems and components described herein. Accordingly, computing device 1600 may be used to perform various procedures and tasks, such as those discussed herein. Computing device 1600 can function as a server, a client or any other computing entity. Computing device 1600 can be any of a wide variety of computing devices, such as a desktop computer, a notebook computer, a server computer, a handheld computer, a tablet, and the like.

Computing device 1600 includes one or more processor(s) 1602, one or more memory device(s) 1604, one or more interface(s) 1606, one or more mass storage device(s) 1608, and one or more Input/Output (I/O) device(s) 1610, all of which are coupled to a bus 1612. Processor(s) 1602 include one or more processors or controllers that execute instructions stored in memory device(s) 1604 and/or mass storage device(s) 1608. Processor(s) 1602 may also include various types of computer-readable media, such as cache memory.

Memory device(s) 1604 include various computer-readable media, such as volatile memory (e.g., random access memory (RAM)) and/or nonvolatile memory (e.g., read-only memory (ROM)). Memory device(s) 1604 may also include rewritable ROM, such as Flash memory.

Mass storage device(s) 1608 include various computer readable media, such as magnetic tapes, magnetic disks, optical disks, solid state memory (e.g., Flash memory), and so forth. Various drives may also be included in mass storage device(s) 1608 to enable reading from and/or writing to the various computer readable media. Mass storage device(s) 1608 include removable media and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, lenses, CCDs or other image capture devices, and the like.

Interface(s) 1606 include various interfaces that allow computing device 1600 to interact with other systems, devices, or computing environments. Example interface(s) 1606 include any number of different network interfaces, such as interfaces to local area networks (LANs), wide area networks (WANs), wireless networks, and the Internet.

Bus 1612 allows processor(s) 1602, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1600 and are executed by processor(s) 1602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

EXAMPLES

The following examples pertain to further embodiments.

Example 1 is a system for performing a secure join of database data, the system comprising. The system includes means for determining data stored in a first account to be compared with data stored in a second account. The system includes means for determining a function for generating a secure join key, wherein the secure join key comprises a hash string that hashes one or more of: a data entry of the first account; a first salt string associated with the first account; a first account identification number associated with the first account; a data entry of the second account; a second salt string associated with the second account; or a second account identification number associated with the second account; and means for providing the secure join key to the first account and/or the second account.

Example 2 is a system as in Example 1, wherein the secure join key comprises a double salted hash value and the function is configured to generate the secure join key based on: the data entry of the first account with the first salt string associated with the first account; and the data entry of the second account with the second salt string associated with the second account; wherein original non-hashed or non-salted data cannot be identified by the first account or the second account based on the secure join key.

Example 3 is a system as in any of Examples 1-2, further comprising means for comparing the data stored in the first account with the data stored in the second account based on the secure join key, wherein the means for comparing is configured to one or more of: identify common data entries between the first account and the second account; determine a number of common data entries between the first account and the second account; or enrich the data stored in the first account and/or the data stored in the second account based on common data entries between the first account and the second account.

Example 4 is a system as in any of Examples 1-3, wherein the function generates the secure join key further based on a salted data entry received from the second account that does not refer to any real data entry in the second account and is included to insert noise into the secure join key.

Example 5 is a system as in any of Examples 1-4, further comprising means for determining a comparison function that comprises procedural logic having instructions for comparing the data stored in the first account with the data stored in the second account, the instructions comprising: comparing a first hashed datapoint from the first account with a second hashed datapoint from the second account, wherein the first hashed datapoint and the second hashed datapoint are generated by the function; determining whether the first hashed datapoint is the same as the second hashed datapoint; and in response to determining that the first hashed datapoint and the second hashed datapoint are the same, generating an indication that the first account and the second account have a common datapoint.

Example 6 is a system as in any of Examples 1-5, wherein the instructions further comprise, in response to determining that the first hashed datapoint and the second hashed datapoint are the same: reverting the first hashed datapoint to a first original datapoint; reverting the second hashed datapoint to a second original datapoint; and enriching the data stored in the first account and/or the data stored in the second account with the first original datapoint and/or the second original datapoint.

Example 7 is a system as in any of Examples 1-6, wherein the function for generating the secure join key is defined by the first account and is executed on an execution platform associated with the second account.

Example 8 is a system as in any of Examples 1-7, wherein the first account does not have visibility into when or if the function for generating the secure join key was executed by the second account.

Example 9 is a system as in any of Examples 1-8, wherein the instructions of the procedural logic further comprise: determining a number of common data entries between the first account and the second account; determining whether the number of common data entries meets a threshold number defined by an account; in response to determining the number of common data entries meets the threshold number, returning results of the comparison function to the account; and in response to determining the number of common data entries does not meet the threshold number, withholding a notification of the results of the comparison function from being delivered to the account.

Example 10 is a system as in any of Examples 1-9, further comprising means for jittering results of the function for generating the secure join key by introducing a random factor that does not comprise a data entry found in either of the first account or the second account.

Example 11 is a method for performing a secure join on database data. The method includes determining data stored in a first account to be compared with data stored in a second account. The method includes determining a function for generating a secure join key, wherein the secure join key comprises a hashed string that hashes one or more of: a data entry of the first account; a first salt string associated with the first account; a first account identification number associated with the first account; a data entry of the second account; a second salt string associated with the second account; or a second account identification number associated with the second account. The method includes providing the secure join key to the first account and/or the second account.

Example 12 is a method as in Example 11, wherein the secure join key comprises a double salted hash value and the function is configured to generate the secure join key based on: the data entry of the first account with the first salt string associated with the first account; and the data entry of the second account with the second salt string associated with the second account; wherein original non-hashed or non-salted data cannot be identified by the first account or the second account based on the secure join key.

Example 13 is a method as in any of Examples 11-12, further comprising comparing the data stored in the first account with the data stored in the second account based on the secure join key, wherein the comparing comprises: identifying common data entries between the first account and the second account; determining a number of common data entries between the first account and the second account; or enriching the data stored in the first account and/or the data stored in the second account based on common data entries between the first account and the second account.

Example 14 is a method as in any of Examples 11-13, wherein the function generates the secure join key further based on a salted data entry received from the second account that does not refer to any real data entry in the second account and is included to insert noise into the secure join key.

Example 15 is a method as in any of Examples 11-14, further comprising determining a comparison function that comprises procedural logic having instructions for comparing the data stored in the first account with the data stored in the second account, the instructions of the procedural logic comprising: comparing a first hashed datapoint from the first account with a second hashed datapoint from the second account, wherein the first hashed datapoint and the second hashed datapoint are generated by the function; determining whether the first hashed datapoint is the same as the second hashed datapoint; and in response to determining that the first hashed datapoint and the second hashed datapoint are the same, generating an indication that the first account and the second account have a common datapoint.

Example 16 is a method as in any of Examples 11-15, wherein the instructions of the procedural logic further comprise, in response to determining that the first hashed datapoint and the second hashed datapoint are the same: reverting the first hashed datapoint to a first original datapoint; reverting the second hashed datapoint to a second original datapoint; and enriching the data stored in the first account and/or the data stored in the second account with the first original datapoint and/or the second original datapoint.

Example 17 is a method as in any of Examples 11-16, wherein the function for generating the secure join key is defined by the first account and is executed on an execution platform associated with the second account.

Example 18 is a method as in any of Examples 11-17, wherein the first account does not have visibility into when or if the function for generating the secure join key was executed by the second account.

Example 19 is a method as in any of Examples 11-18, wherein the instructions of the procedural logic further comprise: determining a number of common data entries between the first account and the second account; determining whether the number of common data entries meets a threshold number defined by an account; in response to determining the number of common data entries meets the threshold number, returning results of the comparison function to the account; and in response to determining the number of common data entries does not meet the threshold number, withholding a notification of the results of the comparison function from being delivered to the account.

Example 20 is a method as in any of Examples 11-19, further comprising jittering results of the function for generating the secure join key by introducing a random factor that does not comprise a data entry found in either of the first account or the second account.

Example 21 is a processor that is programmable to execute instructions stored in non-transitory computer readable storage media. The instructions include determining data stored in a first account to be compared with data stored in a second account. The instructions include determining a function for generating a secure join key, wherein the secure join key comprises a hashed string that hashes one or more of: a data entry of the first account; a first salt string associated with the first account; a first account identification number associated with the first account; a data entry of the second account; a second salt string associated with the second account; or a second account identification number associated with the second account. The method includes providing the secure join key to the first account and/or the second account.

Example 22 is a processor as in Example 21, wherein the secure join key comprises a double salted hash value and the function is configured to generate the secure join key based on: the data entry of the first account with the first salt string associated with the first account; and the data entry of the second account with the second salt string associated with the second account; wherein original non-hashed or non-salted data cannot be identified by the first account or the second account based on the secure join key.

Example 23 is a processor as in any of Examples 21-22, wherein the instructions further comprise comparing the data stored in the first account with the data stored in the second account based on the secure join key, wherein the comparing comprises: identifying common data entries between the first account and the second account; determining a number of common data entries between the first account and the second account; or enriching the data stored in the first account and/or the data stored in the second account based on common data entries between the first account and the second account.

Example 24 is a processor as in any of Examples 21-23, wherein the function generates the secure join key further based on a salted data entry received from the second account that does not refer to any real data entry in the second account and is included to insert noise into the secure join key.

Example 25 is a processor as in any of Examples 21-24, wherein the instructions further comprise determining a comparison function that comprises procedural logic having instructions for comparing the data stored in the first account with the data stored in the second account, the instructions of the procedural logic comprising: comparing a first hashed datapoint from the first account with a second hashed datapoint from the second account, wherein the first hashed datapoint and the second hashed datapoint are generated by the function; determining whether the first hashed datapoint is the same as the second hashed datapoint; and in response to determining that the first hashed datapoint and the second hashed datapoint are the same, generating an indication that the first account and the second account have a common datapoint.

Example 26 is an apparatus including means to perform a method or realize an apparatus or system as in any of Examples 1-25.

Example 27 is a machine-readable storage including machine-readable instructions, when executed, to implement a method or realize an apparatus of any of Examples 1-25.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method, comprising:
    determining data stored in a first account and data stored in a second account to be analyzed, wherein the data stored in the first account and the data stored in the second account each comprise a plurality of datapoints;
    providing to the second account a function to generate a secure join key;
    appending, by a processor, a salt value to each datapoint of the second account and providing the salted datapoints of the second account to the function using a secure view; and
    executing the function to generate the secure join key, wherein the secure join key comprises a hash string of datapoints of the first account and the salted datapoints of the second account.

2. The method of claim 1, further comprising:
    executing a second function to analyze the hash string of datapoints of the secure join key.

3. The method of claim 2, wherein analyzing the hash string of datapoints comprises at least one of:
    identifying common datapoints between the first account and the second account;
    determining a number of common datapoints between the first account and the second account; and
    enriching the data stored in at least the first account or the data stored in the second account based on common datapoints between the first account and the second account.

4. The method of claim 3, wherein identifying common datapoints between the first account and the second account comprises:
    comparing a first hashed datapoint from the first account with a second hashed datapoint from the second account, wherein the first hashed datapoint and the second hashed datapoint are included in the hash string;
    determining whether the first hashed datapoint is the same as the second hashed datapoint; and
    generating an indication that the first account and the second account have a common datapoint in response to determining that the first hashed datapoint and the second hashed datapoint are the same.

5. The method of claim 1, wherein the first account accesses the secure join key via the secure view.

6. The method of claim 1, further comprising:
    hashing each of the salted datapoints of the second account, wherein the hashed salted data points of the second account are provided to the function using the secure view.

7. The method of claim 1, wherein providing the salted datapoints of the second account to the function comprises:
    including with the salted datapoints, one or more additional salted datapoints that do not represent real datapoints of the second account.

8. The method of claim 7, further comprising:
generating the function such that the secure join key is based at least in part on one or more salted datapoints received from the second account that do not represent real datapoints of the second account.

9. The method of claim 1, wherein the function to generate the secure join key is executed by the second account and the first account does not have visibility into whether the function to generate the secure join key was executed by the second account.

10. A system, comprising:
a memory; and
a processor operatively coupled to the memory, the processor to:
determine data stored in a first account and data stored in a second account to be analyzed, wherein the data stored in the first account and the data stored in the second account each comprise a plurality of datapoints;
provide to the second account a function to generate a secure join key;
append a salt value to each datapoint of the second account and providing the salted datapoints of the second account to the function using a secure view; and
execute the function to generate the secure join key, wherein the secure join key comprises a hash string of datapoints of the first account and the salted datapoints of the second account.

11. The system of claim 10, wherein the processor is further to:
execute a second function to analyze the hash string of datapoints of the secure join key.

12. The system of claim 11, wherein to analyze the hash string of datapoints, the processor is to perform at least one of:
identify common datapoints between the first account and the second account;
determine a number of common datapoints between the first account and the second account; and
enrich the data stored in at least the first account or the data stored in the second account based on common datapoints between the first account and the second account.

13. The system of claim 12, wherein to identify common datapoints between the first account and the second account, the processor is to:
compare a first hashed datapoint from the first account with a second hashed datapoint from the second account, wherein the first hashed datapoint and the second hashed datapoint are included in the hash string;
determine whether the first hashed datapoint is the same as the second hashed datapoint; and
generate an indication that the first account and the second account have a common datapoint in response to determining that the first hashed datapoint and the second hashed datapoint are the same.

14. The system of claim 10, wherein the first account accesses the secure join key via the secure view.

15. The system of claim 10, wherein the processor is further to:
hash each of the salted datapoints of the second account, wherein the hashed salted data points of the second account are provided to the function using the secure view.

16. The system of claim 10, wherein to provide the salted datapoints of the second account to the function, the processor is to:
include with the salted datapoints, one or more additional salted datapoints that do not represent real datapoints of the second account.

17. The system of claim 16, wherein the processor is further to:
generate the function such that the secure join key is based at least in part on one or more salted datapoints received from the second account that do not represent real datapoints of the second account.

18. The system of claim 10, wherein the function to generate the secure join key is executed by the second account and the first account does not have visibility into whether the function to generate the secure join key was executed by the second account.

19. A non-transitory computer readable medium, having instructions stored thereon which, when executed by a processor, cause the processor to:
determine data stored in a first account and data stored in a second account to be analyzed, wherein the data stored in the first account and the data stored in the second account each comprise a plurality of datapoints;
provide to the second account a function to generate a secure join key;
append, by the processor, a salt value to each datapoint of the second account and providing the salted datapoints of the second account to the function using a secure view; and
execute the function to generate the secure join key, wherein the secure join key comprises a hash string of datapoints of the first account and the salted datapoints of the second account.

20. The non-transitory computer readable medium of claim 19, wherein the processor is further to:
execute a second function to analyze the hash string of datapoints of the secure join key.

21. The non-transitory computer readable medium of claim 20, wherein to analyze the hash string of datapoints, the processor is to perform at least one of:
identify common datapoints between the first account and the second account;
determine a number of common datapoints between the first account and the second account; and
enrich the data stored in at least the first account or the data stored in the second account based on common datapoints between the first account and the second account.

22. The non-transitory computer readable medium of claim 21, wherein to identify common datapoints between the first account and the second account, the processor is to:
compare a first hashed datapoint from the first account with a second hashed datapoint from the second account, wherein the first hashed datapoint and the second hashed datapoint are included in the hash string;
determine whether the first hashed datapoint is the same as the second hashed datapoint; and
generate an indication that the first account and the second account have a common datapoint in response to determining that the first hashed datapoint and the second hashed datapoint are the same.

23. The non-transitory computer readable medium of claim 19, wherein the first account accesses the secure join key via the secure view.

24. The non-transitory computer readable medium of claim 19, wherein the processor is further to:

hash each of the salted datapoints of the second account, wherein the hashed salted data points of the second account are provided to the function using the secure view.

25. The non-transitory computer readable medium of claim 19, wherein to provide the salted datapoints of the second account to the function, the processor is to:
include with the salted datapoints, one or more additional salted datapoints that do not represent real datapoints of the second account.

26. The non-transitory computer readable medium of claim 25, wherein the processor is further to:
generate the function such that the secure join key is based at least in part on one or more salted datapoints received from the second account that do not represent real datapoints of the second account.

27. The non-transitory computer readable medium of claim 19, wherein the function to generate the secure join key is executed by the second account and the first account does not have visibility into whether the function to generate the secure join key was executed by the second account.

\* \* \* \* \*

UNITED STATES PATENT AND TRADEMARK OFFICE
CERTIFICATE OF CORRECTION

PATENT NO. : 10,783,271 B1  
APPLICATION NO. : 16/902266  
DATED : September 22, 2020  
INVENTOR(S) : Langseth et al.

Page 1 of 1

It is certified that error appears in the above-identified patent and that said Letters Patent is hereby corrected as shown below:

On the Title Page

In item (*), please insert --This patent is subject to a terminal disclaimer.-- after "Subject to any disclaimer, the term of this patent is extended or adjusted under 35 U.S.C. 154(b) by 0 days."

In item (45), please replace "Sep. 22, 2020" with --*Sep. 22, 2020--

In the Specification

In Column 1, Line 7-8, please replace "This application is a continuation of U.S. application Ser. No. 16/368,339, filed Mar. 28. 2019," with --This application is a continuation of U.S. application Ser. No. 16/708,067, filed Dec. 9, 2019, which is a continuation of U.S. application Ser. No. 16/368,339, filed Mar. 28. 2019, now U.S. Patent No. 11,188,670.--

In Column 4, Line 39, please replace "UDF" with --UDF.--

In Column 6, Line 25-26, please replace "sha2(current_account( ) || 'provider secret salt'))" and insert the same on Line 26, as a new sentence In Column 6, Line 61, please replace "string(C_EMAI L_ADDRESS," with --string(C_EMAIL_ADDRESS,--

In Column 18, Line 38, please replace "user defined function" with --user-defined function--

In Column 18, Line 48, please replace "user defined function" with --user-defined function--

Signed and Sealed this  
Nineteenth Day of December, 2023

Katherine Kelly Vidal  
*Director of the United States Patent and Trademark Office*